(12) United States Patent
Takimoto et al.

(10) Patent No.: US 7,384,065 B2
(45) Date of Patent: Jun. 10, 2008

(54) KNEE PROTECTION AIRBAG DEVICE

(75) Inventors: Masahiro Takimoto, Aichi (JP);
Tatsuya Hayakawa, Toyota (JP)

(73) Assignees: Toyoda Gosei Co., Ltd., Aichi-ken (JP); Toyota Jidosha Kabushiki Kaisha, Aichi-ken (JP)

( * ) Notice: Subject to any disclaimer, the term of this patent is extended or adjusted under 35 U.S.C. 154(b) by 345 days.

(21) Appl. No.: 10/478,699

(22) PCT Filed: Dec. 2, 2002

(86) PCT No.: PCT/JP02/12593

§ 371 (c)(1),
(2), (4) Date: Dec. 9, 2003

(87) PCT Pub. No.: WO03/048268

PCT Pub. Date: Jun. 12, 2003

(65) Prior Publication Data
US 2004/0245750 A1 Dec. 9, 2004

(30) Foreign Application Priority Data
Dec. 6, 2001 (JP) .............................. 2001-373253

(51) Int. Cl.
B60R 21/16 (2006.01)
B60R 21/205 (2006.01)
(52) U.S. Cl. ................................... 280/732; 280/730.1
(58) Field of Classification Search ............. 280/730.1, 280/743.2, 743.1, 732
See application file for complete search history.

(56) References Cited
U.S. PATENT DOCUMENTS
3,618,978 A * 11/1971 Klove et al. .............. 280/730.1

5,324,070 A * 6/1994 Kitagawa et al. ........ 280/730.1
5,513,877 A * 5/1996 MacBrien et al. .......... 280/732
6,155,595 A * 12/2000 Schultz ...................... 280/729
6,176,509 B1 * 1/2001 Kawaguchi et al. ..... 280/728.1

(Continued)

FOREIGN PATENT DOCUMENTS
JP A-53-147341 12/1978

(Continued)

OTHER PUBLICATIONS

A printed copy from Toyota Motor website about "CALDINA" at http://www.toyota.co.jp/Showroom/All_toyota_lineup/caldina/main.html, updated on Dec. 3, 2003.

(Continued)

Primary Examiner—Ruth Ilan
Assistant Examiner—Barry Gooden, Jr.
(74) Attorney, Agent, or Firm—Posz Law Group, PLC

(57) ABSTRACT

The knee protection airbag device (S1) includes an airbag (40) which protrudes rearward from a deployment opening of a housing upon inflow of inflation gas, and deploys upward to be located in front of knees of an occupant between a vehicular body and the occupant. The airbag (40) includes an occupant's side wall (41) and a vehicular body side wall (42). Lower end (48) side of the airbag (40) as flatly expanded with the walls (41 and 42) overlaid on each other constitutes an upstream side of inflation gas. The airbag (40) is firstly folded to bring its upper end (47) close to its lower end (48), from flat expanded state in which the occupant's side wall (41) and the vehicular body side wall (42) are overlaid on each other. Thereafter, the airbag (40) is folded to reduce its transverse width, and then is housed in the housing. The airbag (40) of the knee protection airbag device (S1) is able to deploy effectively from the start to completion of deployment for protecting the knees of the occupant.

4 Claims, 30 Drawing Sheets

U.S. PATENT DOCUMENTS

| | | | |
|---|---|---|---|
| 6,196,585 B1* | 3/2001 | Igawa | 280/743.1 |
| 6,286,866 B1* | 9/2001 | Satge et al. | 280/743.1 |
| 6,752,417 B2* | 6/2004 | Takimoto et al. | 280/730.1 |
| 6,902,186 B2* | 6/2005 | Suzuki et al. | 280/730.1 |
| 6,945,557 B2* | 9/2005 | Takimoto et al. | 280/730.1 |
| 6,945,562 B2* | 9/2005 | Abe | 280/743.1 |
| 2002/0171230 A1* | 11/2002 | Takimoto et al. | 280/730.1 |
| 2002/0171231 A1* | 11/2002 | Takimoto et al. | 280/730.1 |
| 2003/0094795 A1* | 5/2003 | Takimoto et al. | 280/730.1 |
| 2003/0107206 A1* | 6/2003 | Takimoto et al. | 280/730.1 |
| 2003/0120409 A1* | 6/2003 | Takimoto et al. | 701/45 |
| 2003/0132617 A1* | 7/2003 | Takimoto et al. | 280/730.1 |
| 2003/0184069 A1* | 10/2003 | Takimoto et al. | 280/743.1 |
| 2004/0075253 A1* | 4/2004 | Morita | 280/730.1 |

FOREIGN PATENT DOCUMENTS

| | | |
|---|---|---|
| JP | A-58-110338 | 6/1983 |
| JP | U-02-56053 | 4/1990 |
| JP | A-5-208653 | 8/1993 |
| JP | A-8-80797 | 3/1996 |
| JP | A-9-123862 | 5/1997 |
| JP | A-9-207701 | 8/1997 |
| JP | A-9-254730 | 9/1997 |
| JP | A-10-315894 | 12/1998 |
| JP | A-11-321539 | 11/1999 |
| JP | A-2000-190799 | 7/2000 |
| JP | A-2000-512951 | 10/2000 |
| JP | A-2002-249016 | 9/2002 |
| JP | A-2002-337652 | 11/2002 |
| WO | WO 02/04261 A1 | 1/2002 |
| WO | WO 02/04262 A1 | 1/2002 |

OTHER PUBLICATIONS

Excerpt from Toyota car "Harrier" manual published in Feb. 2003, pp. 2-132 to 2-140.

Excerpt from Toyota car "Celsior" manual published in Aug. 2003, pp. 2-57 to 2-58.

Excerpt from Toyota car "Avensis" manual published in Oct. 2003, pp. 2-119 and 2-122.

Excerpt from Toyota car "Crown" manual published in Dec. 2003.

* cited by examiner

| Fig.18C | Fig.18D | Fig.18E | Fig.18F |

KNEE PROTECTION AIRBAG DEVICE

TECHNICAL FIELD

The present invention relates to a knee protection airbag device which protects knees of a vehicle occupant such as a driver or a passenger in front passenger's seat with an airbag expanding and inflating with inflation gas.

BACKGROUND ART

In the prior art, Japanese Patent Laid-Open No. 8-80797 and No. 10-315894, for example, disclose devices for protecting the knees of a vehicle occupant such as a driver. The airbag device disclosed in the former is located below column cover, and includes an airbag to deploy for protecting the driver from shin to knee when actuated. The airbag device in the latter is located near the column cover below steering wheel, and includes an airbag to deploy for protecting the driver from lower side of the knee to the vicinity of toe when actuated.

However, these knee protection airbag devices have a room for improvement in inflating the airbags effectively along with the course of time from the start to completion of airbag deployment to protect the knees of the occupant.

DISCLOSURE OF INVENTION

It is an object of the present invention to provide an airbag device for knee protection capable of deploying an airbag effectively along with the course of time from the start to completion of airbag deployment and thereby of protecting knees of an occupant properly.

The first knee protection airbag device according to the present invention is arranged in front of knees of a seated vehicle occupant, with its airbag folded and housed therein.

Upon inflow of inflation gas, the airbag protrudes rearward from a deployment opening of its housing to deploy upward, and is located in front of the knees of the occupant between a vehicle body and the occupant for protecting the knees of the occupant. The airbag includes an occupant's side wall to be disposed toward the occupant and a vehicular body side wall to be disposed toward the vehicular body, respectively upon deployment. A lower side of the airbag as flatly expanded with the vehicular body side wall and the occupant's side wall overlaid on each other constitutes an upstream side of inflation gas. In a folding process, the airbag firstly is folded to bring its upper end close to its lower end from flat expanded state with the vehicular body side wall and the occupant's side wall overlaid on each other, and then folded to reduce its transverse width for housing.

In the first knee protection airbag device according to the present invention, the airbag expands and inflates generally inversely to the folding process when inflation gas flows into the airbag. More specifically, the airbag protruded rearward from the deployment opening of the housing firstly unfolds from transversely narrowed state, thereby increasing the transverse width for covering the deployment opening and its periphery.

Then the folding which has brought the upper end closer to the lower end is unfolded. By this time, the airbag has been expanded in transverse direction enough to cover the deployment opening and its periphery. Accordingly, the airbag deploys upward in the transversely expanded state.

In the first knee protection airbag device according to the present invention, therefore, the airbag, in the initial stage of deployment, protrudes rearward from the deployment opening of the housing, and expands and inflates widely in transverse direction so as to cover the deployment opening and its periphery, especially the left and right peripheries, for protecting the front side of the knees. The knee protection airbag device has just been actuated at this point. Since the vehicle is making a front collision, the knees of the occupant advance relative to the vehicle. However, since the airbag is deployed in transversely expanded state from the peripheral edge of the deployment opening, the airbag is able to protect the both knees of the occupant properly, even if brake operation or inertia force causes the knees to move right and left.

After the airbag goes through the initial stage of deployment, the knees are bent and rise upward if the driver advances relative to the vehicle with his toes landed on the floor panel, whether or not the knees touch the airbag. By this time, the airbag has deployed upward in transversely expanded state over the periphery of deployment opening. Thus, the airbag completely deployed upward is able to protect the knees moving upward.

Therefore, the first knee protection airbag device according to the present invention is able to deploy the airbag effectively along with the course of time from the start to completion of airbag deployment, and thereby to protect the knees of the occupant properly.

Moreover, since the first knee protection airbag device is able to configure inflated shape of the airbag properly along with the course of time from the start to completion of airbag deployment, the airbag does not have to be inflated largely from the initial stage of inflation so as to have a large protecting area. Accordingly, the airbag device is able to protect the knees of the occupant properly without employing an inflator with great output or an airbag with great capacity.

The airbag is desirably roll-folded on the vehicular body side wall from the upper end when it is folded to bring the upper end close to the lower end.

With this arrangement, the roll-folded portion is unrolled when unfolded in deployment action. If the folded portion engages the occupant, unfolding of the folded portion and airbag deployment are rather accelerated than hindered by being contacted by the occupant. Consequently, the airbag is able to deploy smoothly without applying unnecessary pressure to the occupant.

In reducing the transverse width of the airbag, the left and right end sides of the folded portion of the airbag folded from the upper end toward the lower end are desirably folded to be located on the occupant's side wall and below transverse center of the folded portion.

With this arrangement, the left and right ends of the folded portion of the airbag folded to bring its upper end close to its lower end (as will be called "vertically folded portion" hereinafter) are housed on the occupant's side wall and below the transverse center of the folded portion. In the initial stage of airbag deployment, the left and right ends of the vertically folded portion unfold by turning upward to be back in the same horizontal line as a center of the vertically folded portion. Thus the left and right ends are restored to the state before being folded back. The center of the vertically folded portion is prevented, by the left and right ends positioned on the occupant's side wall, from unfolding until the restoration of the left and right ends. Consequently, the center of the vertically folded portion is prevented from partially inflating upward. In other words, the unfolding of the vertically folded portion is performed generally uniformly in generally entire transverse area of the airbag after the left and right ends come in the same horizontal line with the central portion. As a result, with this construction, the airbag is able to deploy upward further smoothly even if the space between the vehicular body side and the occupant is narrow.

Without considering the above point, the left and right ends of the folded portion may be placed above the transverse center of the folded portion. Alternatively, the left and right ends of the folded portion may be placed either rearward or forward of the transverse center of the folded portion, either on the occupant's side wall or on the vehicular body side wall.

It is appreciated, when reducing the transverse width of the airbag, that the left and right ends of the folded portion of the airbag folded to bring the upper end close to the lower end are roll-folded toward the transverse center of the folded portion so as to be close to each other.

This arrangement is preferably adopted for a compact folding of an airbag with great transverse width as flatly expanded with the occupant's side wall and the vehicular body side wall overlaid on each other.

It is desired that the left and right ends of the airbag folded to reduce its transverse width are located outward of knee centers of the left and right knees of the occupant, respectively, along the transverse direction.

With this arrangement, the airbag is housed in a condition capable of protecting the front side of the knees of the occupant from undeployed stage. Accordingly, the airbag is able to protect the knee centers of the knees of the occupant properly as soon as it protrudes rearward from the deployment opening of the housing in the initial stage of deployment.

With the above arrangement, moreover, the left and right ends of the vertically folded portion have less folded and piled portion. Therefore, it is possible to reduce substantial depth of the housing space for the airbag.

Furthermore, the airbag may include a tether joining the vehicular body side wall and the occupant's side wall for regulating thickness of the inflated airbag. This tether is desirably arranged along the transverse direction of the airbag so as to direct inflation gas from the upstream side within the airbag toward the left and right directions.

With this arrangement, inflation gas, when flowing from the upstream side to the downstream side within the airbag, is directed outward in the transverse direction of the airbag. Therefore, the airbag is able to expand in the left and right direction further smoothly in the initial stage of deployment.

In a second knee protection airbag device according to the present invention, an airbag as in the first knee protection airbag device is housed as only folded to bring the upper end close to the lower end from flat expanded condition in which the occupant's side wall and the vehicular body side wall are overlaid on each other.

In the second knee protection airbag device according to the present invention, if the inflation gas is introduced in the airbag, the airbag protrudes rearward from the deployment opening of the housing, and immediately deploys upward.

More specifically, in the second knee protection airbag device, as soon as the airbag protrudes rearward from the deployment opening of the housing, it is deployed in front of the knees of the occupant with a width wide enough to protect the knees. Therefore, the airbag in the initial stage of deployment is able to protect the knees properly in a wide area even if the knees are moved in the transverse direction. Moreover, even if the knees are bent and rise thereafter, the airbag has already been through the initial stage of deployment, and deployed upward from a periphery of the deployment opening by that time. Therefore, the airbag is able to protect the rising knees with its part completely deployed upward.

Consequently, the second knee protection airbag device according to the present invention, too, is able to deploy the airbag effectively along with the course of time from the start to completion of the airbag deployment, and thereby of protecting the knees of the occupant properly.

In the second knee protection airbag device, moreover, the airbag is not folded to reduce its transverse width as in the first knee protection airbag device. Therefore, the airbag is able to complete deployment quickly.

In the second airbag device, too, the folded airbag is desirably housed with its left and right ends located outward of the individual knee centers of the left and right knees of the occupant in the transverse direction.

With this arrangement, the airbag is housed in a condition capable of protecting the front side of the knees of the occupant from undeployed stage. Accordingly, the airbag is able to protect the knee centers of the knees of the occupant properly as soon as it protrudes rearward from the deployment opening of the housing in the initial stage of deployment.

With this arrangement, moreover, the left and right ends of the vertically folded portion are not folded. Therefore, it is possible to reduce substantial depth of the housing space for the airbag.

Here, up-down, left-right, and front-rear in this specification correspond to the up-down, left-right, and front-rear of the vehicle as the knee protection airbag device is mounted on the vehicle.

DESCRIPTION OF THE PREFERRED EMBODIMENTS

Preferred embodiments of the present invention are described below with reference to the accompanying drawings.

As shown in FIGS. 1 to 4, the knee protection airbag device S1 of a first embodiment is arranged below steering column 3 in front of a driver MD as an occupant M for protecting the knees K of the driver MD.

Figure 1:
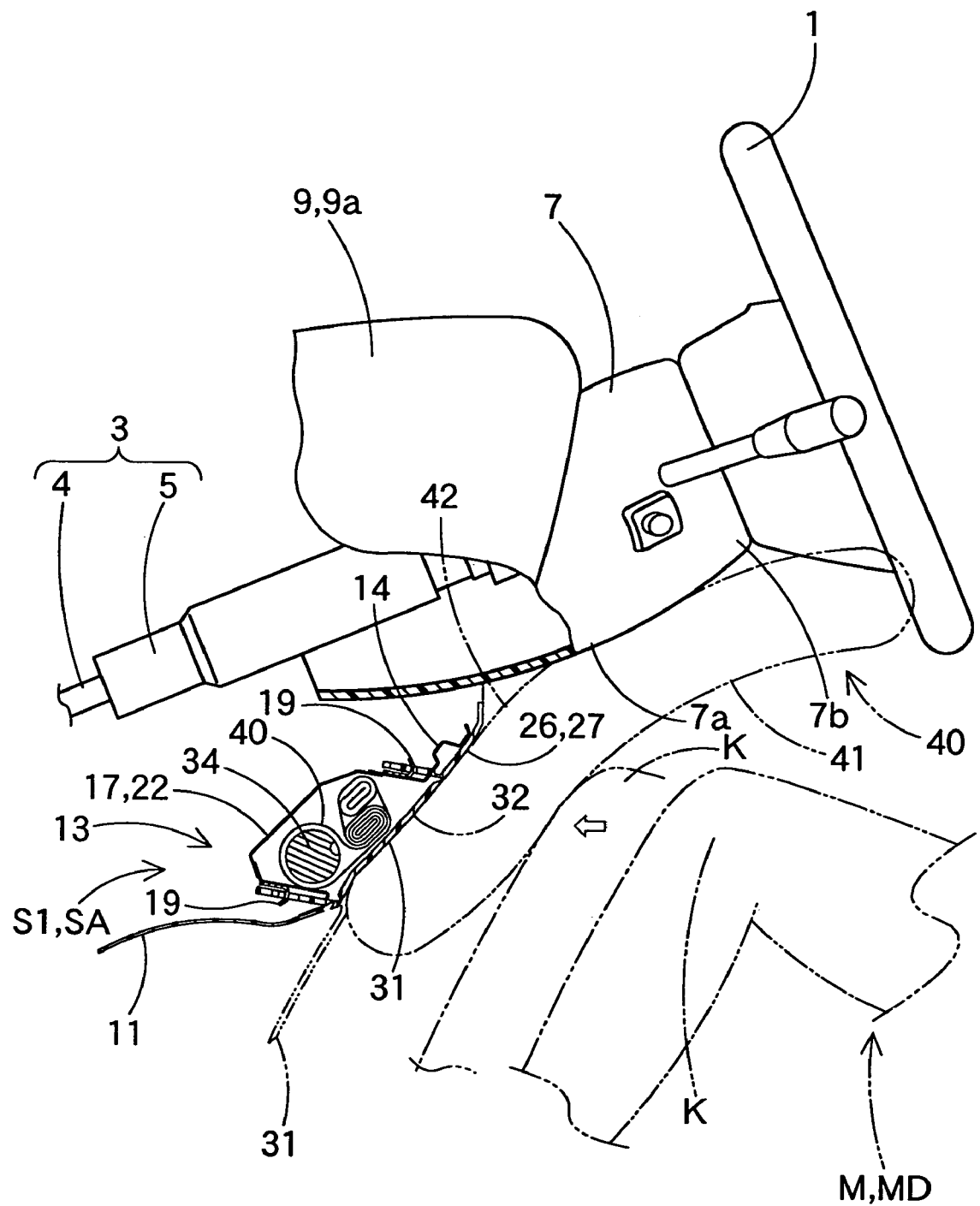
FIG. 1 is a schematic vertical section of a first embodiment of the knee protection airbag device according to the present invention in action, taken along the longitudinal direction of the vehicle.

As shown in FIG. 1, the steering column 3 is covered by a column cover 7. The steering column 3 includes a main shaft 4 connected to the steering wheel 1, and a column tube 5 covering the main shaft 4. Between the main shaft 4 and the column tube 5, there are arranged a not-shown tilt mechanism for adjusting the angle of ring face of the steering wheel 1, and a not-shown telescopic mechanism for shifting and stopping the steering wheel 1 in the axial direction of the shaft 4, and so on.

The column cover 7 is formed of synthetic resin into a generally square cylindrical shape, and is so arranged along the axial direction of the steering column 3 as to cover the steering column 3. More specifically, the column cover 7 ascends backward to arrange its vehicular front side downward and its vehicular rear side upward. The lower surface 7a of a portion of the column cover 7 protruded from the instrument panel (as will be called "dashboard" hereinafater) 9 has a generally rectangular shape, and is curved to ascend backward in the longitudinal direction of the vehicle.

The knee protection airbag device S1 includes a folded airbag 40, an inflator 34 for supplying the airbag 40 with inflation gas, an airbag cover 26 covering the folded airbag 40, and a housing case 13, and is arranged below the column cover 7 as a member of the vehicle body. In the airbag device S1, the airbag 40, the inflator 34 and the airbag cover 26 are assembled with the housing case 13 to form an integral airbag module SA. The airbag device S1 is mounted on the vehicle by attaching the airbag module SA to the vehicle.

The housing case 13 is made of a sheet metal. As shown in FIGS. 1 to 4, the case 13 includes a plate-like portion 14 and a housing portion 17 for housing the folded airbag 40 and the inflator 34.

The housing portion 17 has a bottomed box shape with an opening 17a directed rearward of the vehicle. In the foregoing embodiment, the housing portion 17 has a generally rectangular parallel piped box shape including a generally rectangular bottom wall 22 and a generally square cylindrical side wall portion 18. The side wall portion 18 enclosing the opening 17a is provided, in the walls 18a and 18b confronting each other in the transverse direction of the vehicle, with a large and small round mounting holes 20 and 21 for attaching the inflator 34. The mounting hole 20 is adapted to support the outer circumference of the later-described body 34a of the inflator 34 by the inner circumference when the cylindrical inflator body 34a is inserted thereinto. The inner diameter of the mounting hole 21 is so configured that the body 34a of the inflator 34 cannot go through, but the later-described male screw portion 34c of the inflator 34 may be inserted thereinto. To install the inflator 34 to the housing portion 17, the side of the male screw 34c of the inflator 34 is so inset into the mounting hole 20 from outward of the housing portion 17 as to protrude from the mounting hole 21. Then the male screw 34c is screwed into a nut 35.

On the outer circumference of the side wall portion 18, there are fixed a plurality of hooks 19 having generally J-shaped section which have their leading ends bent toward the bottom wall 22 and away from the opening 17a. Four hooks 19 are disposed at the side of the later-described hinge line 30 in the airbag cover 26 (or at the lower side face of the case side wall portion 18), three hooks are disposed at the side of the leading end 31a of the later-described door 31 of the airbag cover 26 (or at the upper side face of the case side wall portion 18), and one each on the left and right side walls of the vehicle.

The plate-like portion 14 extends from the peripheral edge of the opening 17a of the housing portion 17, and is so formed in a generally rectangular shape as to widely cover the front side of the left and right knees K (KL and KR) of the seated deriver MD. The plate-like portion 14 is provided at four corners of its periphery with four mounting pieces 15, respectively, for attachment to the vehicular body. The vicinity of the upper edge of the opening 17a in the plate-like portion 14 is recessed downward so that the lower surface 7a of the column cover 7 may protrude rearward, and is curved rearward along with the curve of the lower surface 17a. In the area from the peripheral edge of the opening 17a to the outer peripheral edge of the plate-like portion 14, there are formed a plurality of ribs 14a for stiffening the plate-like portion 14. These ribs 14a are adapted to support the later-described general portion 27 of the airbag cover 26 by their vehicle's rear side faces.

In the periphery of the opening 17a in the plate-like portion 14, there are formed a plurality of through holes 14b opened in generally rectangular shapes. The later-described mounting pieces 28 of the airbag cover 26 are to be inserted through these through holes 14b to be retained by the hooks 19.

At the left and right sides of the plate-like portion 14 away from the housing portion 17, a plurality of mounting holes 14c are punched through. These mounting holes 14c are employed to attach the airbag cover 26 to the housing case 13 by means of thermal-caulking. More specifically, later-described mounting legs 27a of the airbag cover 26 are inserted into the individual mounting holes 14c. Then the heads of the individual mounting legs 27a are melted to enlarge their diameter, and are resolidified so as not to come off from the mounting holes 14c. By cooperation of the mounting legs 27a and the hooks 19, the airbag cover 26 is attached to the housing case 13.

In the individual mounting pieces 15 of the housing case 13, there are formed joint holes (not shown) for the bolt 24 fastening (refer to FIG. 4) to the body 1. The individual mounting pieces 15 are fastened by the bolts 24 to predetermined brackets secured to dashboard reinforcement, center brace or front body pillar as members of the vehicle body. These brackets help absorb impact by being plastically deformed.

In the foregoing embodiment, the housing case 13 is integrally molded by pressing to have the plate-like portion 14 and the housing portion 17. However, the housing case 13 may be formed by welding a sheet metal.

The airbag cover 26 is formed of thermo-plastic elastomer of polyolefin or the like, and has a larger contour than the housing case 13 so as to cover the vehicle's rear side of the housing case 13, as shown in FIGS. 1 to 4.

Here, the airbag cover 26 is arranged toward the lower panel 9b of the dashboard 9 around the column cover 7 to cover the lower periphery of the column cover 7 protruded from the dashboard 9. Accordingly, the airbag cover 26 is recessed downward at its upper center as viewed from the vehicle's rear side to correspond to the rearward protrusion of the column cover 7. The upper edge of the airbag cover 26 is curved and raised rearward below the recess along with the curve of the column cover lower surface 7a. The dashboard 9 is composed of an upper panel 9a and the lower panel 9b.

The airbag cover 26 includes a door 31 covering the opening 17a of the housing portion 17, and a general portion 27 covering the vehicle's rear side of the plate-like portion 14.

The door 31 is formed in a generally rectangular plate shape slightly larger than the opening 17a. In an inverted-U shaped portion at the outer periphery of the door 31, there is formed a weakened breakable portion 29 continuous from the general portion 27 for helping the door 31 open downward. The breakable portion 29 is formed by providing continuous or intermittent grooves in the vehicle's front side face as to be easily broken when the door 31 is pushed by the airbag 40 inflating.

At the lower edge of the door 31, there is formed a hinge line 30 which the door 31 turns around when opening by the breakage of the breakable portion 29. The hinge line 30 is an integral hinge, and is thick enough not to be broken but thinner than the general portion 27 and the door 31.

A deployment opening 32 is provided when the breakable portion 29 is broken to open the door 31 around the hinge line 30. Through the deployment opening 32, the airbag 40 upon deployment protrudes rearward of the vehicle from the housing portion 17.

In the entire periphery of the opening 17a in the general portion 27, there are protruded toward the vehicle's front side a plurality of mounting pieces 28. Each of the mounting pieces 28 is formed in a generally rectangular plate shape, and is inserted through each of the through holes 14b in the plate-like portion 14 of the housing case 13. Each of the mounting pieces 28 is provided with a retaining hole 28a to be retained at the peripheral edge by the hook 19. The retaining hole 28a is opened in a rectangular shape.

Figure 3:
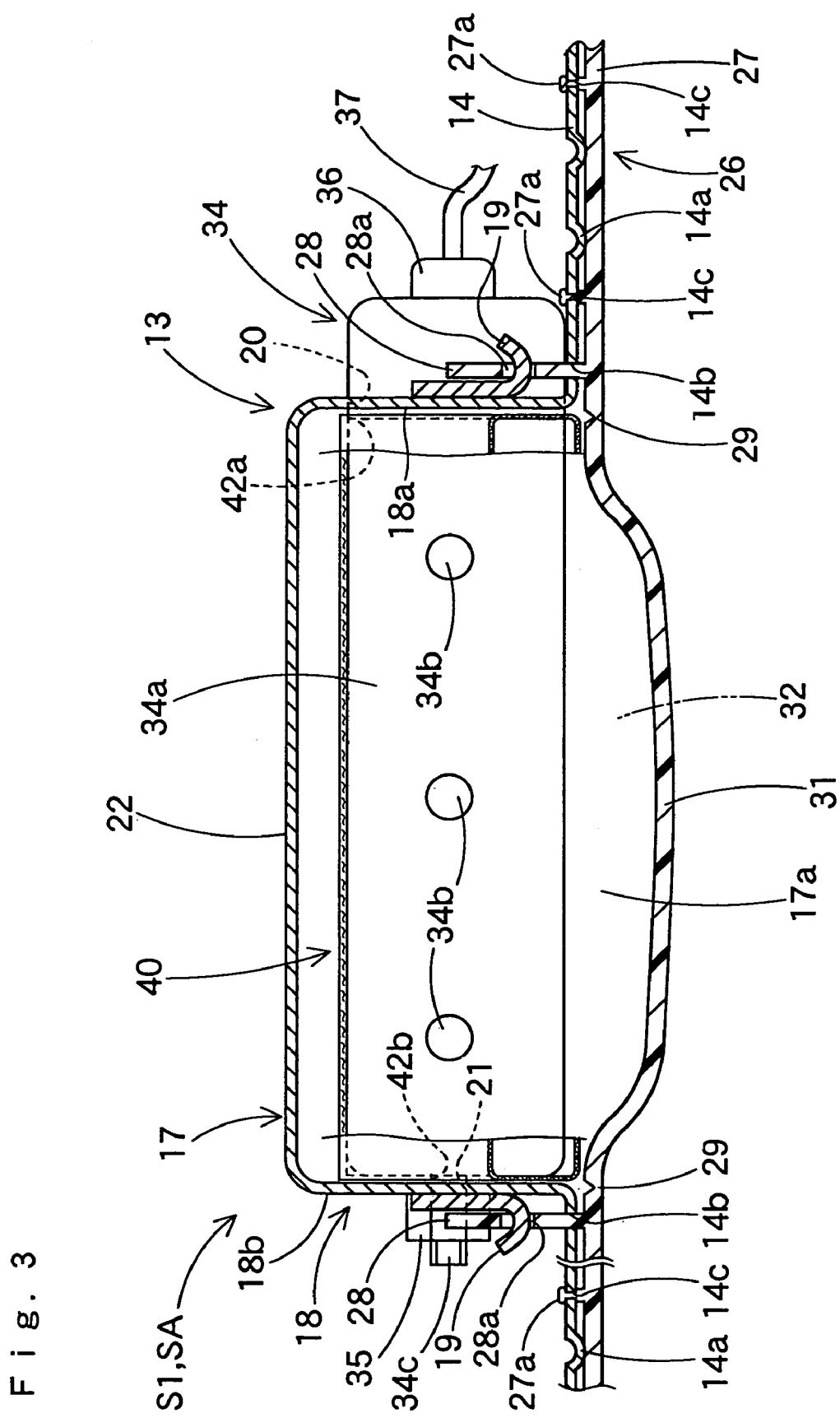
FIG. 3 is a schematic section taken along the line III-III of FIG. 2.

At predetermined positions of the general portion 27, there are formed a plurality of mounting legs 27a to be retained by thermal-caulking at the peripheral edges of the mounting holes 14c in the plate-like portion 14 of the housing case 13. Before thermal-caulking, each of the mounting legs 27a has such a round rod shape as to pass through the mounting hole 14c. As shown in FIG. 3, the heads of the mounting legs 27a are crushed after thermal-caulking.

Figure 2:
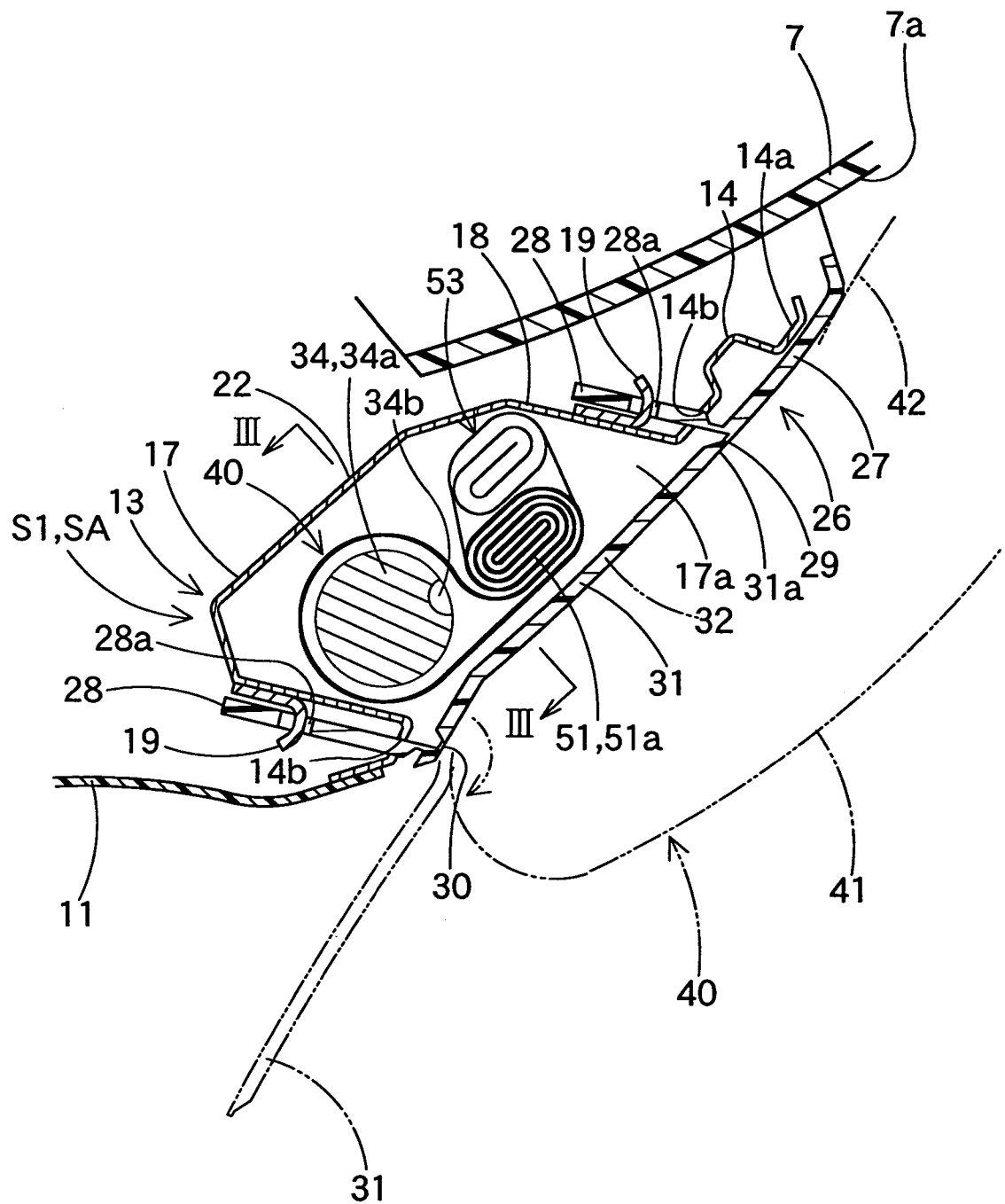
FIG. 2 is a schematic enlarged vertical section of the first embodiment of the knee protection airbag device, taken along the longitudinal direction of the vehicle.

As shown in FIGS. 1 to 3, the inflator 34 is of a cylinder type, and is constructed to discharge inflation gas G in response to an electric signal. The inflator 34 includes a cylindrical body 34a with a plurality of gas discharge ports 34b. The male screw portion 34c is protruded from one end of the body 34a. To house the inflator 34 in the housing portion 17, the inflator 34 is put in the housing portion 17 from the mounting hole 20, so that the male screw portion 34c is protruded from the mounting hole 21. By fastening the male screw 34c protruded from the case 13 with the nut 35, the end face of the body 34a with the male screw 34c is pressed onto the peripheral edge of the mounting hole 21 of the housing portion 17, and the outer circumference of the body 34a apart from the male screw portion 34c is supported by the inner circumference of the mounting hole 20. Thus the inflator 34 is housed in and held by the housing case 13. When housed in the housing portion 17, the inflator 34 is inserted through the later-described mounting holes 42a and 42b of the airbag 40.

This inflator 34 is actuated in response to an electric signal from a not-shown control device. The control device also puts a not-shown airbag device mounted on the steering wheel 1 in action. The control device inputs an electric signal for actuation simultaneously to the inflator 34 and the airbag device for steering wheel. A connector 36 is connected to the end face of the body 34a protruded from the housing portion 17. A lead wire 37 led from an airbag actuating circuit is connected the connector 36.

Figure 4:
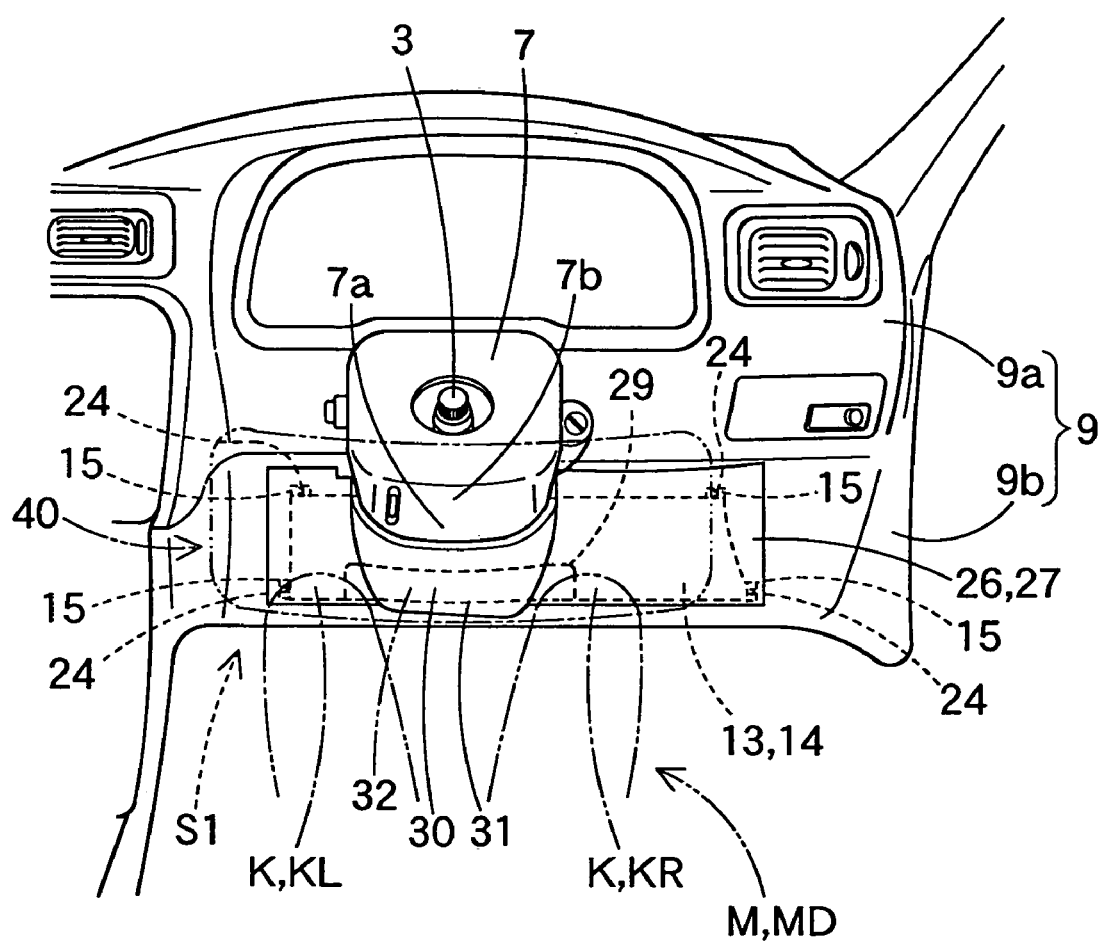
FIG. 4 is a schematic front view of the first embodiment of the knee protection airbag device in action, as viewed from the rear side of the vehicle.
Figure 5:
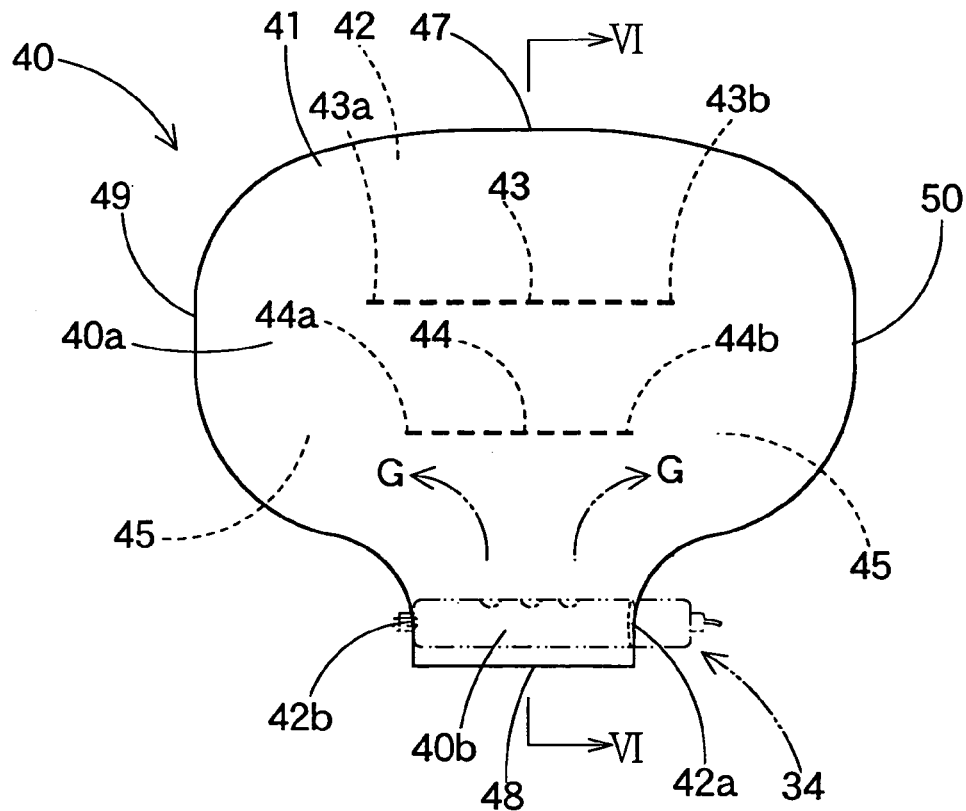
FIG. 5 is a front view of an airbag used in the first embodiment.
Figure 6:
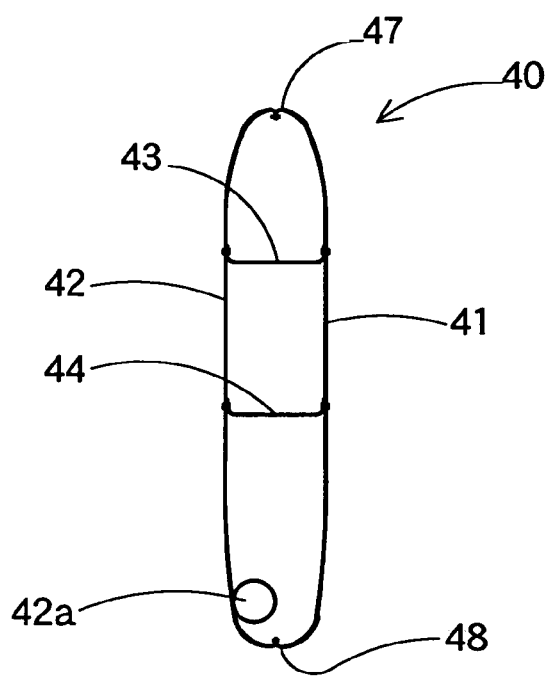
FIG. 6 is a schematic section taken along the line VI-VI of FIG. 5.

The airbag 40 is formed of a flexible woven fabric of polyester, polyamide or the like, and has a generally rectangular plate shape as expanded and inflated completely, as shown in FIGS. 4 to 6. The airbag 40 includes a mounting portion 40b at the lower end side, and a body 40a arranged above the mounting portion 40b. The mounting portion 40b is provided with mounting holes 42a and 42b. The airbag 40 has a small transverse width at the mounting portion 40b, and a larger transverse width at the body 40a. The airbag 40 is formed of two woven fabrics, i.e., an occupant's side wall 41 at the side of the driver MD and a vehicular body side wall 42 at the side of the column cover 7, each of which having a generally rectangular shape. The airbag 40 is formed by sewing up the peripheral edges of the walls 41 and 42.

Two mounting holes 42a and 42b are formed in the lower side of the vehicular body side wall 42. The mounting hole 42a has its inner diameter generally equal to the outer diameter of the body 34a of the inflator 34 so that the body 34a may be inserted therethrough. The mounting hole 42b has such a smaller inner diameter than the outer diameter of the body 34a as to pass the male screw portion 34c through. The inflator body 34a is inserted into the mounting hole 42a, and the male screw portion 34c is inserted into the mounting hole 42b. Then the inner circumferences of the mounting holes 42a and 42b are supported by the body 34a and the male screw portion 34c of the inflator 34. In other words, the airbag 40 is attached to the housing case 13 utilizing the inflator 34 housed in the housing portion 17.

The airbag 40 is provided with two band-shaped tethers 43 and 44 arranged up and down along the transverse direction. The tethers 43 and 44 function as a thickness regulating means to uniform the thickness of the deployed airbag 40 so that the airbag 40 may smoothly go in between the knees K of the driver MD and the column cover lower surface 7a. The tethers 43 and 44 are configured to connect the occupant's side wall 41 and the vehicular body side wall 42. The left and right ends 43a, 43b, 44a and 44b of the tethers 43 and 44 are apart from the left and right edges 49 and 50 of the airbag 40.

In the first embodiment, the airbag body 40a, upon deployment, protrudes rearward from a deployment opening 32 provided by the opening of the door 31, and covers from the vehicle's rear side face of the general portion 27 of the airbag cover 26 including the left and right periphery of the opening 32, up to at least the vicinity of the upper end 7b of the column cover lower surface 7a, and also covers the front side of the knees K (KL and KR) of the driver MD.

Figure 7A:
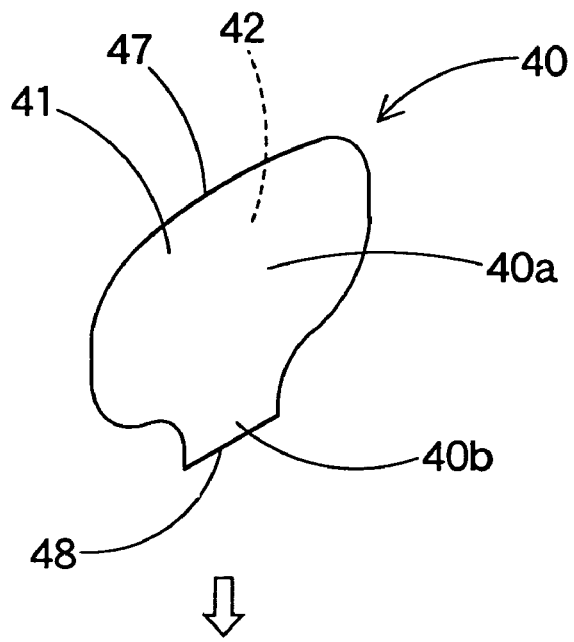
FIG. 7 schematically illustrates the folding process of the airbag of the first embodiment.
Figure 7B:
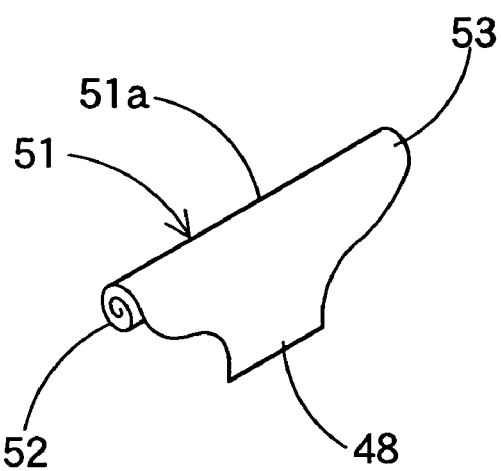

FIG. 7 illustrate the folding process of the airbag 40. Firstly as shown in FIGS. 7A and 7B, the airbag 40 is folded from flat expanded state in which the vehicular body side wall 42 and the occupant's side wall 41 are overlaid on each other to bring its upper end 47 closer to the lower end 48. In the foregoing embodiment, the upper end 47 side is roll-folded on the vehicular body side wall 42. Thus, a vertically folded portion 51 is formed with a smaller vertical dimension than that of the airbag 40.

Figure 7C:
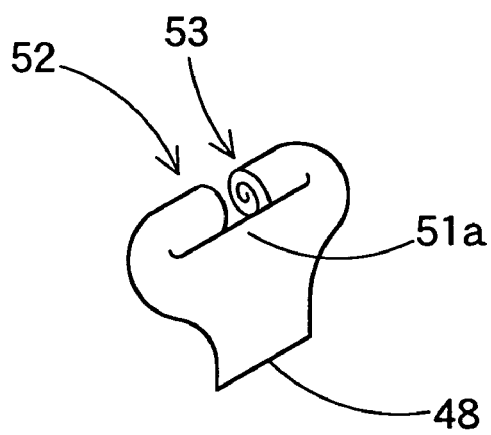

As shown in FIGS. 7B and 7C, subsequently, left and right ends 52 and 53 of the roll-folded portion 51 are folded back so that the transverse width of the airbag 40 may be narrowed and fit the transverse width of the housing portion 17. In the first embodiment, the left and right ends 52 and 53 are folded upward (more specifically, upward on the vehicular body side wall 42, or obliquely up and forward, as shown in FIG. 2).

After folding, the airbag 40 is wrapped around by a not-shown breakable wrapping film for keeping the folded-up shape. Subsequently, the airbag 40 is housed in the housing portion 17 so that the mounting holes 20 and 42a, and the mounting holes 21 and 42b may match each other. At this time, the wrapping film is broken at portions of the mounting holes 42a and 42b.

Thereafter, the male screw portion 34c is inserted into the airbag 40 housed in the housing portion 17 from the mounting holes 20 and 42a, and then protruded from the mounting holes 42b and 21. Then the nut 35 is fastened with the protruded male screw portion 34c, so that the end face of the body 34a with the male screw 34c is pressed onto the inner circumference of the housing portion 17 (or the wall 18b) with the peripheral edge of the mounting hole 42a of the airbag 40 interposed. Thus the inflator 34 and the airbag 40 are attached to the housing portion 17.

Subsequently, the airbag cover 26 is attached to the housing case 13. At first, the mounting pieces 28 are individually inserted into the corresponding through holes 14b from vehicle's rear side of the housing case 13, while the round-headed mounting legs 27a are inserted into the corresponding mounting holes 14c. At this time, each of the mounting pieces 28 engages the hook 19 and is elastically deformed to go away from the housing portion 17. Then each of the mounting pieces 28 restores and the hook 19 is inserted into the retaining hole 28a. Consequently, the hooks 19 retain the peripheral edges of the mounting holes 28a.

Next, each of the heads of the mounting legs 27a protruded from the respective mounting hole 14c is thermal-caulked and retained at the peripheral edge of the mounting hole 14c on the vehicle's front side face of the plate-like portion 14. Thus, the airbag cover 26 is attached to the housing case 13, and thus the airbag module SA is formed.

If the individual mounting pieces 15 of the plate-like portion 14 in the airbag module SA are bolt 24 fastened with the predetermined brackets on the side of the body 1, the knee protection airbag device S1 is mounted on the vehicle.

After the airbag device S1 is mounted on the vehicle, the lead wire 37 is connected to the airbag actuating circuit, and the upper panel 9a and the lower panel 9b of the dashboard 9, and the under cover 11 (refer to FIGS. 1 and 2) are attached to the vehicle.

After the airbag device S1 is mounted on the vehicle, if a predetermined electric signal is inputted to the inflator 34, inflation gas G is discharged from the gas discharge ports 34b to inflate the airbag 40. Then the airbag 40 breaks the not-shown wrapping film, pushes the door 31 of the airbag cover 26 and breaks the breakable portion 29, so that the door 31 opens downward on the hinge line 30. Accordingly, the airbag 40 protrudes rearward from the opening 17a of the housing portion 17 and through the deployment opening 32 of the airbag cover 26 provided by the opening of the door 31. The airbag 40 further expands and inflates upward along the column cover lower surface 7a, as shown in FIGS. 8, 9A and 9B.

In the knee protection airbag device S1, the airbag 40 expands and inflates generally inversely to the folding process when inflation gas G flows into the airbag 40. More specifically, as shown in FIG. 9A, the airbag 40 protruded rearward from the deployment opening 32 firstly unfolds the left and right ends 52 and 53 from transversely narrowed state, thereby increasing its transverse width for covering the deployment opening 32 and its periphery.

Figure 8:
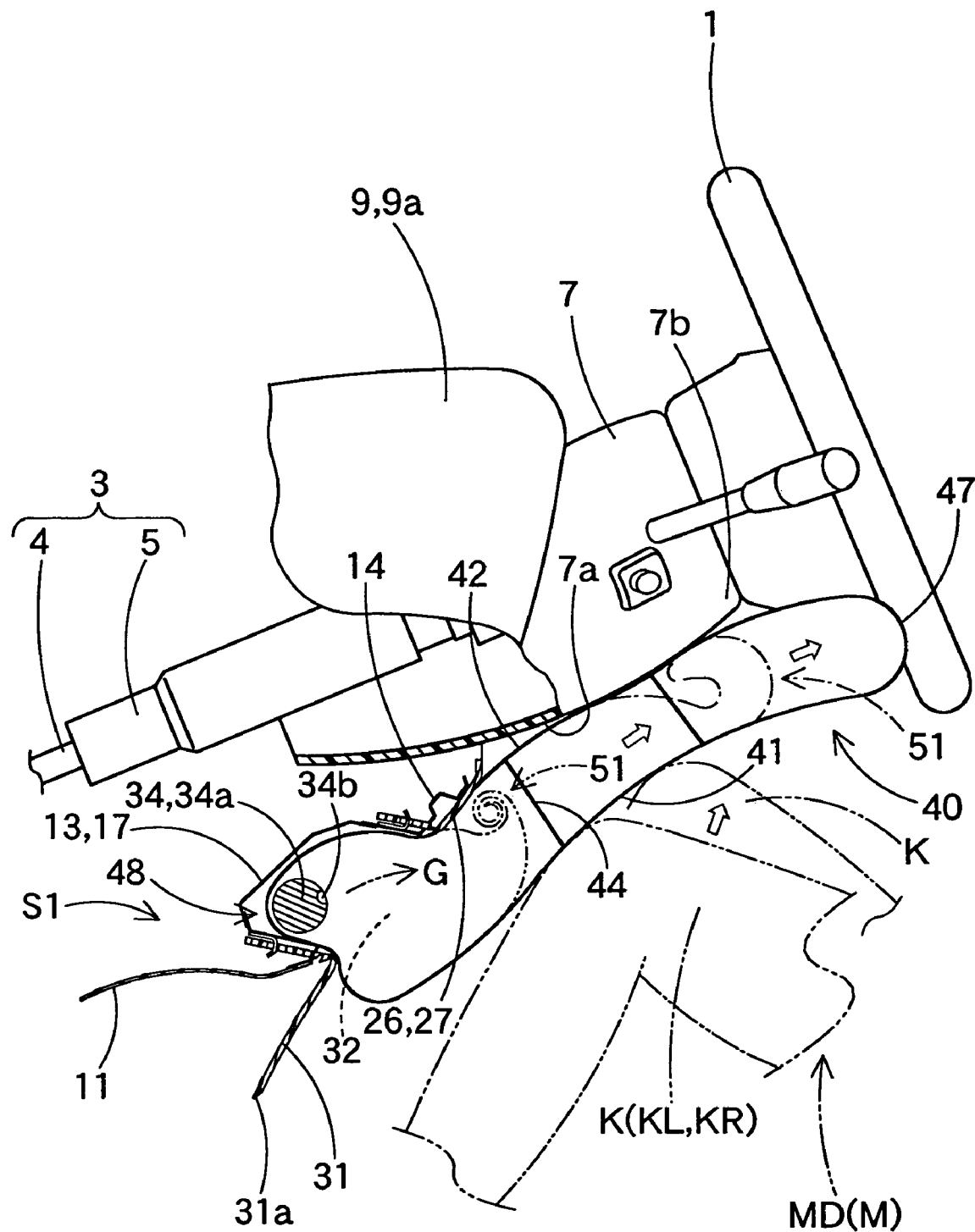
FIG. 8 is a schematic vertical section of the airbag of the first embodiment completely deployed, taken along the longitudinal direction of the vehicle.
Figure 9A:
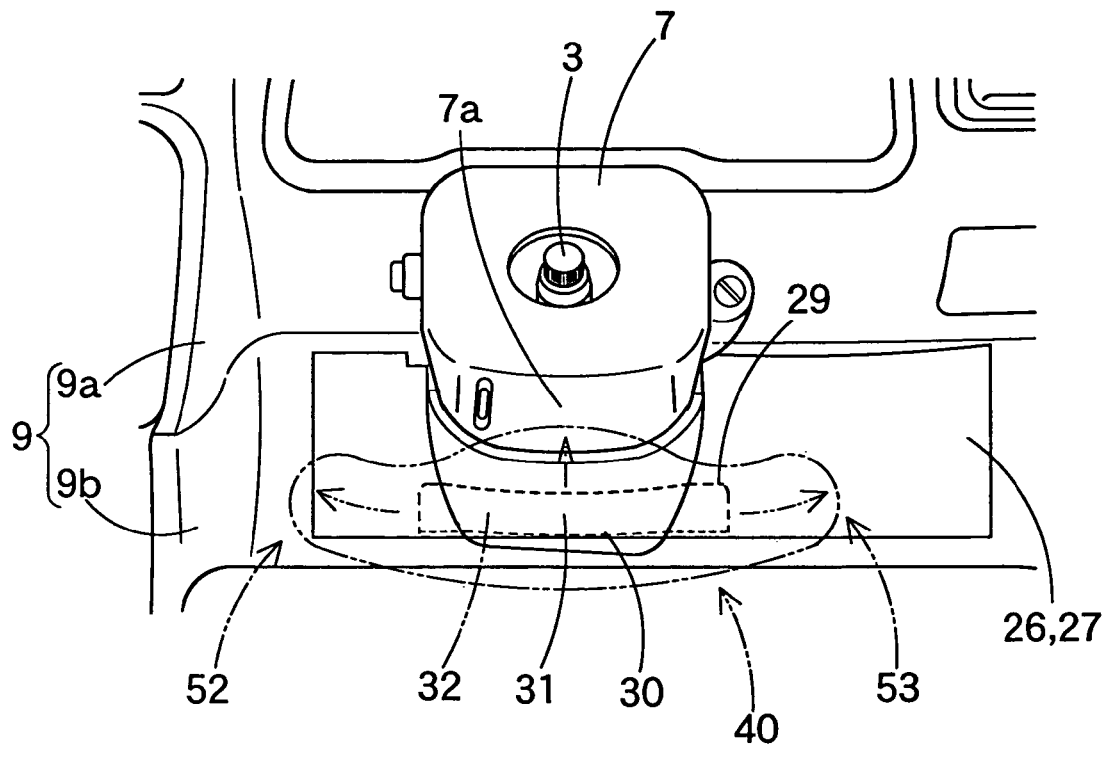
FIG. 9 is a schematic front view illustrating the airbag deployment in the first embodiment, as viewed from the rear side of the vehicle.
Figure 9A:
Figure 9B:
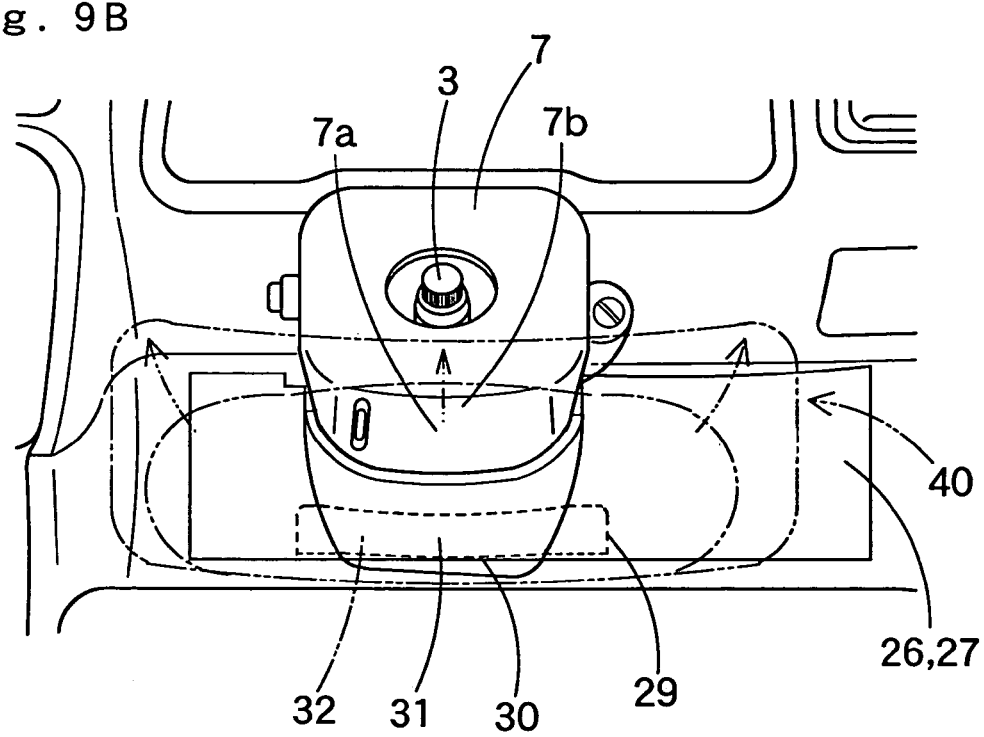

Then as shown in FIGS. 8 and 9B, the roll-folding which has brought the upper end 47 closer to the lower end 48 is unfolded. By this time, the airbag 40 has been expanded in transverse direction enough to cover the deployment opening 32 and its periphery. Accordingly, the airbag 40 deploys upward in the transversely expanded state.

In the knee protection airbag device S1 in the first embodiment, more specifically, the airbag 40 protrudes rearward from the deployment opening 32 of the housing portion 17, and expands and inflates widely in transverse direction so as to cover the deployment opening 32 and its periphery, especially the left and right peripheries for protecting the knees K (KL and KR), in the initial stage of deployment, as shown in FIGS. 8 and 9A. The knee protection airbag device S1 has just been actuated at this point. On the other hand, since the vehicle is making a front collision, the knees K of the occupant MD advance relative to the vehicle (refer to FIG. 1). However, since the airbag 40 is deployed in transversely expanded state from the peripheral edge of the deployment opening 32, the airbag 40 is able to protect the both knees K (KL and KR, refer to FIG. 4) of the occupant MD properly, even if brake operation or inertia force causes the knees K to move right and left.

After the airbag 40 goes through the initial stage of deployment, the knees K are bent and rise (refer to FIG. 8) if the driver MD advances relative to the vehicle with his toes landed on the floor panel, whether or not the knees K touch the airbag 40. By this time, the airbag 40 has deployed upward in transversely expanded state over the periphery of deployment opening 32, as shown in FIG. 9B. Thus, the airbag 40 completely deployed upward is able to protect the knees K moving upward.

Therefore, the knee protection airbag device S1 in the first embodiment is able to deploy the airbag 40 effectively along with the course of time from the start to completion of the deployment of airbag 40, and thereby to protect the knees K (KL and KR) of the occupant MD properly.

Moreover, the knee protection airbag device S1 in the foregoing embodiment is able to configure inflated shape of the airbag 40 properly along with the course of time from the start to completion of airbag deployment. More specifically, the airbag does not have to be inflated largely so as to have a large protecting area from the initial stage of inflation. Accordingly, the airbag device S1 is able to protect the knees KL and KR of the occupant MD properly without employing an inflator 34 with great output or an airbag 40 with great capacity.

In the first embodiment, moreover, the airbag 40 is roll-folded on the vehicular body side wall 42 to bring the upper end 47 of the airbag 40 closer to the lower end 48 at the beginning. When unfolded in deployment action, the roll-folded portion 51 is unrolled. If the folded portion 51 engages the occupant MD, unrolling of the portion 51 and airbag deployment are rather accelerated than hindered by being contacted by the occupant MD. Therefore, the airbag 40 is able to deploy smoothly without applying unnecessary pressure to the occupant MD.

In the airbag 40 in the first embodiment, furthermore, the inflation gas G flows toward the left and right directions by the lower tether 44 transversely arranged when flowing from the upstream side of inflation gas G, or the side of the mounting portion 40b toward the body 40a, as shown in FIG. 5. The gas G further flows into a part above the tether 44 through gas communication passages 45 formed between the inner surface of the left and right edges 49 and 50 of the airbag 40 and the left and right ends 44a and 44b of the tether 44. In other words, in the part near the mounting portion 40b of the body 40a, which is the upstream side of inflation gas G, the inflation gas G is directed outward in the left and right direction. Consequently, the airbag body 40a is able to expand in the left and right direction further smoothly in the initial stage of deployment.

Without considering the above point, the airbag 40 may be roll-folded on the occupant's side wall 41, or may be folded in a bellows fashion at the beginning of the folding while bringing the upper end 47 closer to the lower end 48. Alternatively, the airbag 40 may be cactus-folded by putting the upper end 47 side within the airbag 40 and bringing the same closer to the lower end 48. Further alternatively, the tether 44 may be arranged in V-shape or U-shape as viewed from the vehicle's rear side, instead of being arranged along transverse direction.

If the housing portion 17 for housing the airbag 40 has a great transverse width, only one of the left and right ends 52 and 53 of the folded portion 51 may be folded in the folding of the airbag 40.

Figure 10A:
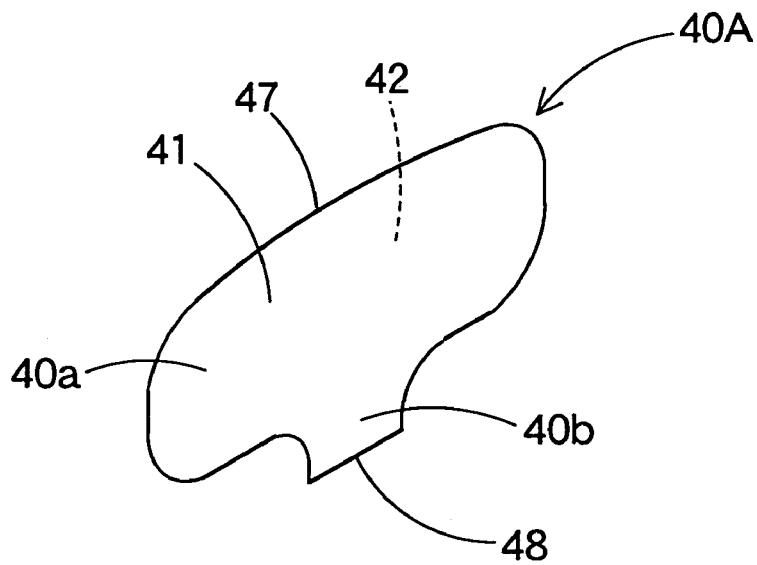
FIG. 10 schematically illustrates the folding process of an airbag used in another embodiment.
Figure 10B:
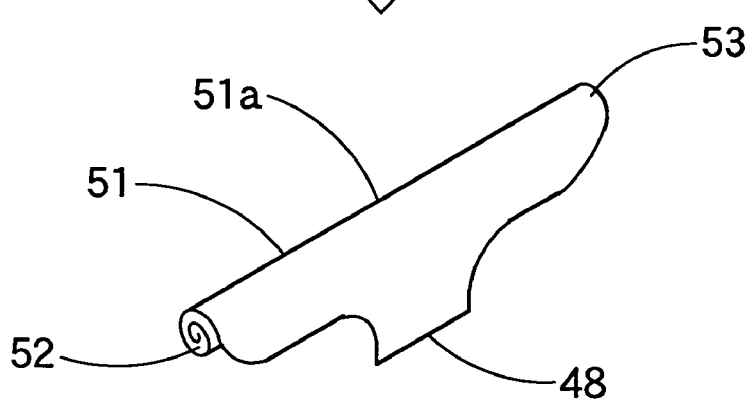
Figure 10C:
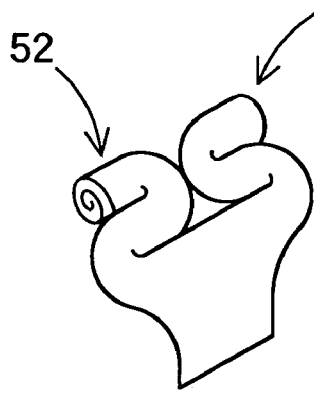
Figure 10D:
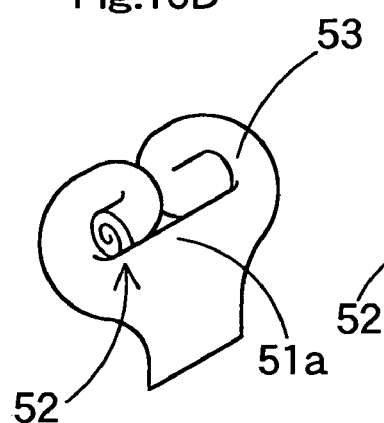
Figure 10E:
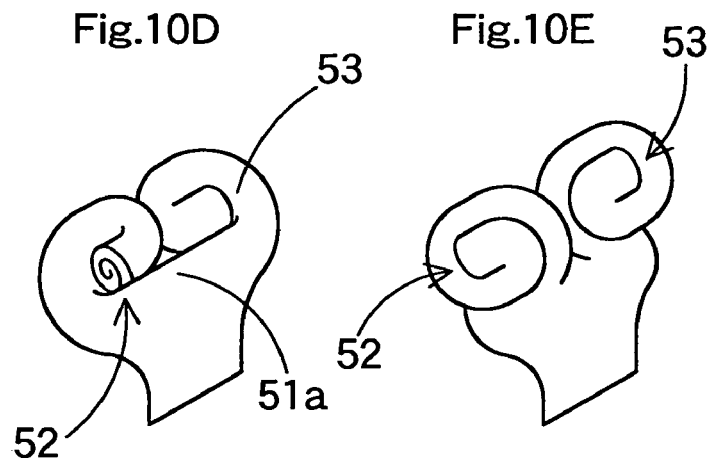

When the left and right ends 52 and 53 of the folded portion 51 are folded to reduce the transverse width, the following folding method may also be adopted. To begin with, as shown in FIGS. 10A and 10B, the airbag 40A is roll-folded on the vehicular body side wall 42 bringing the upper end 47 closer to the lower end 48 from flat expanded state. Thereafter, as shown in FIG. 10C, the left and right ends 52 and 53 of the folded portion 51 are folded in a bellows fashion. Alternatively, as shown in FIG. 10D, the left and right ends 52 and 53 of the folded portion 51 are individually roll-folded internally toward the transverse center 51a of the folded portion 51. Further alternatively, as shown in FIG. 10E, the folded portion 51 may be folded by roll-folding the individual left and right ends 52 and 53 outwardly. In either case, the ends 52 and 53 are brought closer to each other to complete the folding. These folding methods are preferably adopted in compactly folding an airbag 40A with great transverse width as flat expanded with the vehicular body side wall 42 and the occupant's side wall 41 overlaid on each other. Moreover, the left and right ends 52 and 53 of the folded portion 51 may be folded asymmetrically. For example, the left end 52 side may be bellows-folded while the right end 53 side is roll-folded internally or outwardly. The inversion of this may be adopted, too.

Moreover, the left and right ends 52 and 53 sides of the folded portion 51 may be folded and placed at positions other than the upper side relative to the central portion 51a of the folded portion 51.

Figure 11:
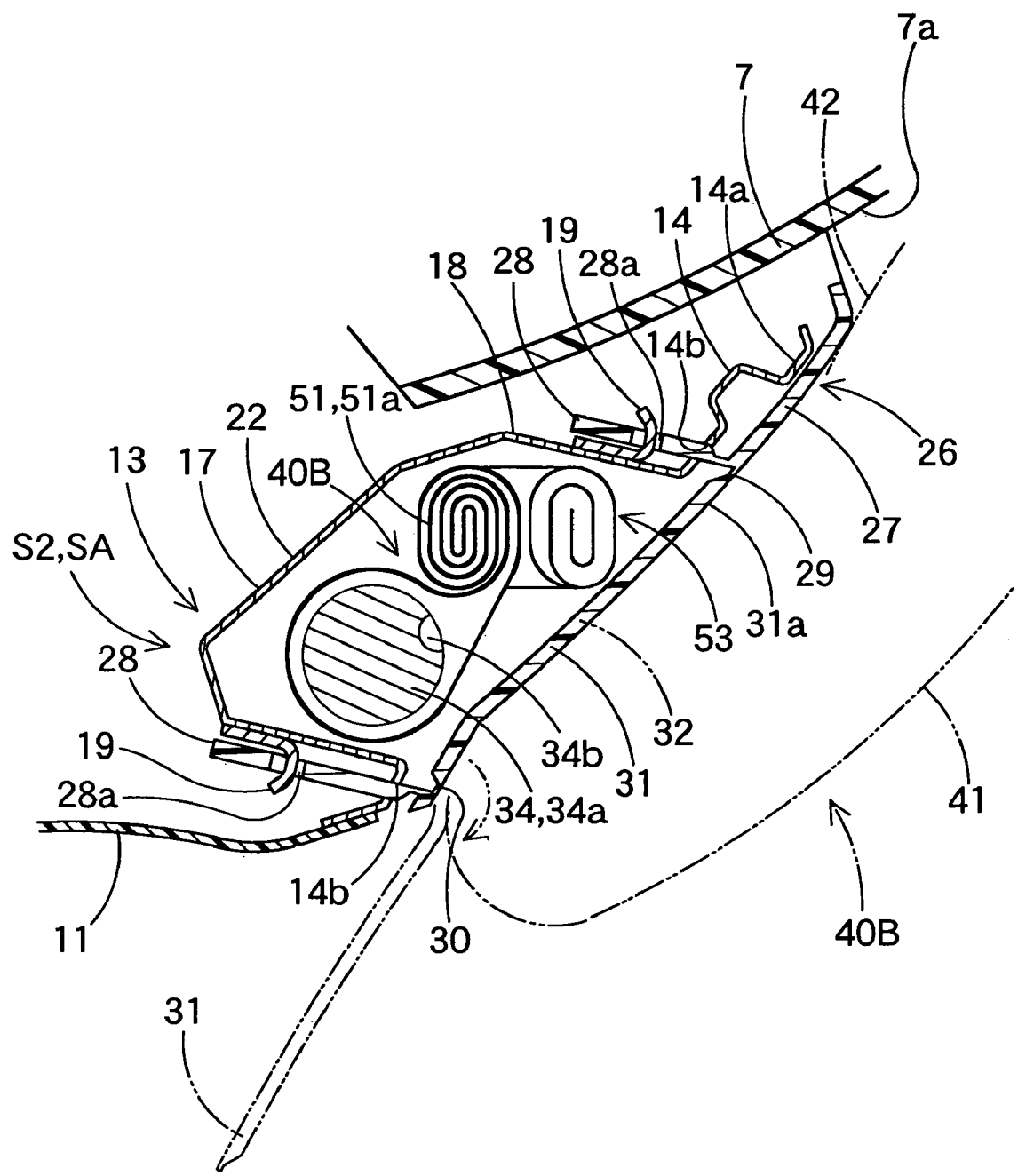
FIG. 11 is a schematic enlarged vertical section of a second embodiment of the knee protection airbag device, taken along the longitudinal direction of the vehicle.
Figure 12A:
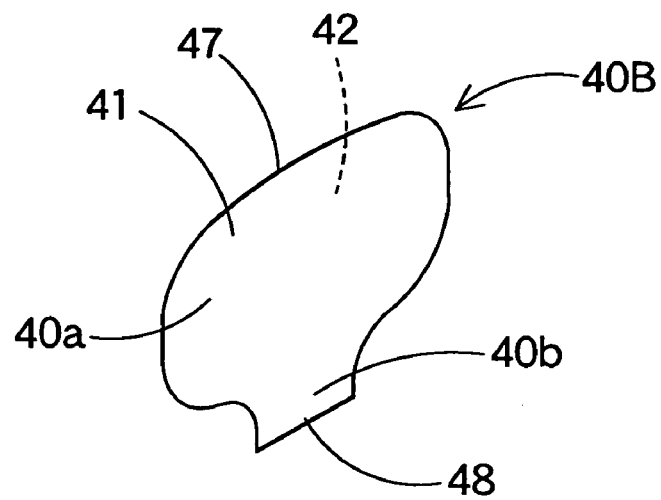
FIG. 12 schematically illustrates the folding process of an airbag of the second embodiment.
Figure 12A:
Figure 12B:
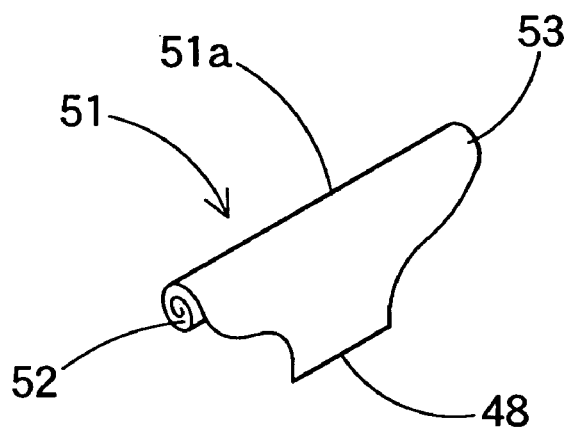
Figure 12B:
Figure 12C:
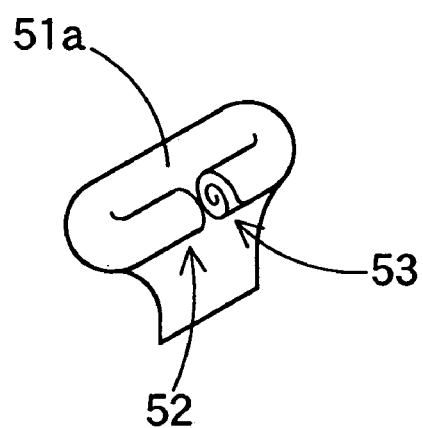

In a knee protection airbag device S2 of the second embodiment shown in FIG. 11, for example, the left and right ends 52 and 53 sides of the roll-folded portion 51 in an airbag 40B are placed rearward of the central portion 51a of the folded portion 51. The airbag 40B is firstly roll-folded on the vehicular body side wall 42 bringing the upper end 47 of the flat expanded airbag 40B closer to the lower end 48, as shown in FIGS. 12A and 12B. Subsequently, as shown in FIG. 12C, the left and right ends 52 and 53 of the folded portion 51 are folded back rearward to complete the folding work of the airbag 40B. Thereafter, the airbag 40B is housed in the case 13, as the airbag 40, thereby forming an airbag module SA for attachment to the vehicle.

Figure 13:
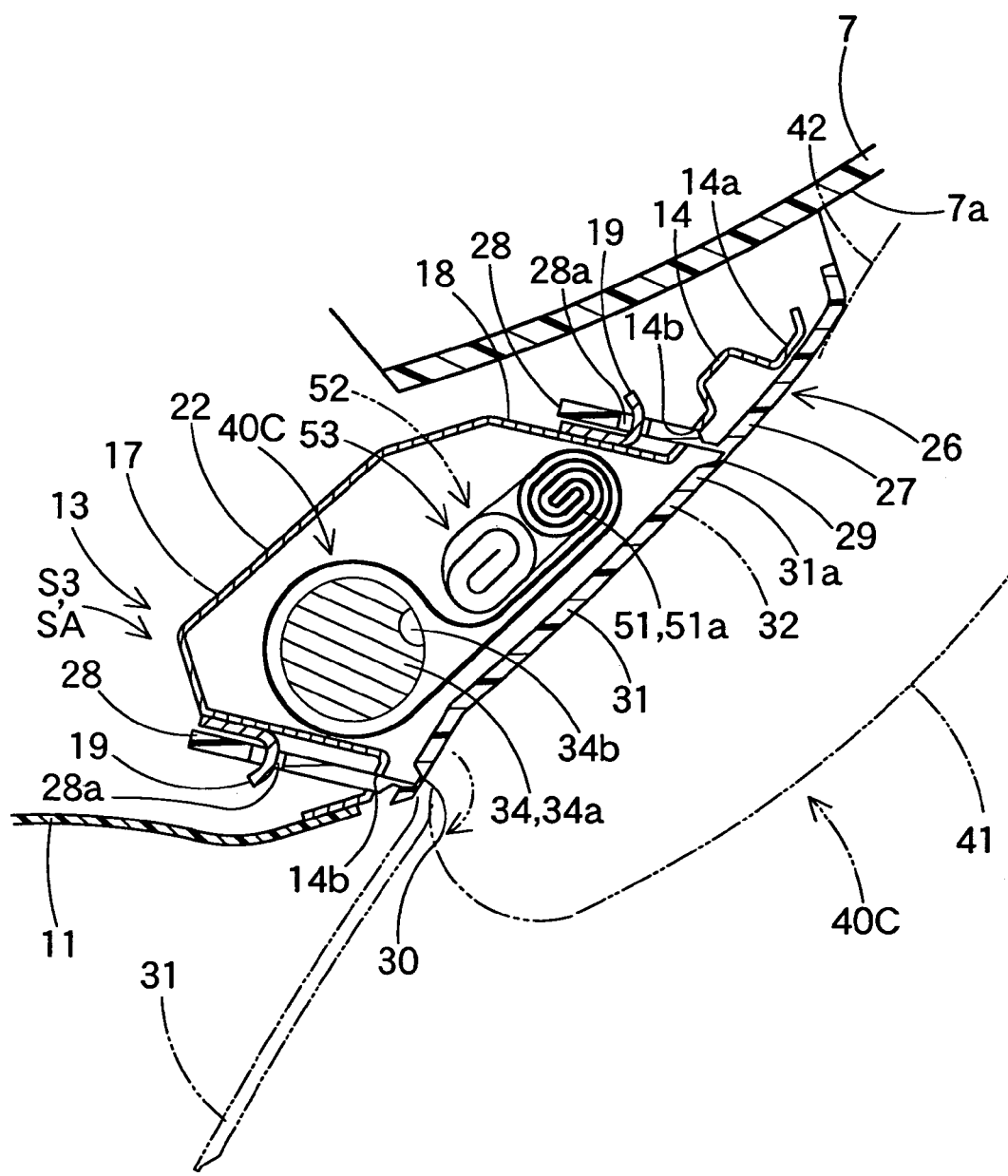
FIG. 13 is a schematic enlarged vertical section of a third embodiment of the knee protection airbag device, taken along the longitudinal direction of the vehicle.

Of course, in FIG. 12C, the left and right ends 52 and 53 may be folded forward or downward relative to the central portion 51a of the folded portion 51 when completing the folding work. For example, in a knee protection airbag device S3 of a third embodiment shown in FIG. 13, an airbag 40C is housed in the housing portion 17 with its left and right ends 52 and 53 folded forward (more particularly, toward the front lower side) in the final stage of folding work.

Figure 14A:
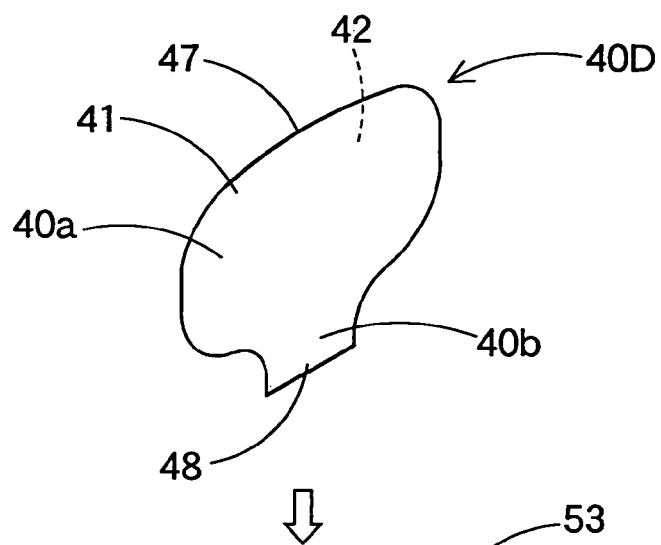
FIG. 14 schematically illustrates the folding process of an airbag used in yet another embodiment.
Figure 14B:
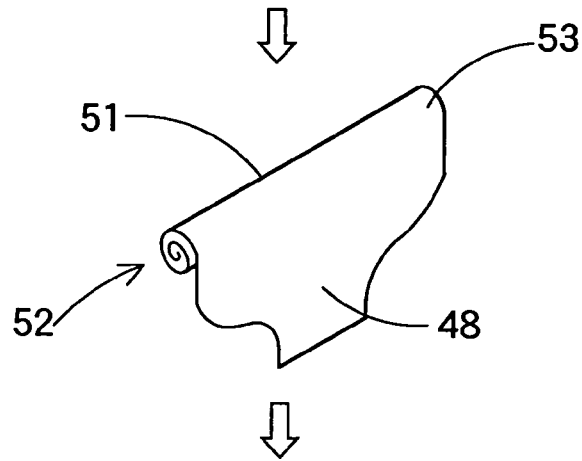
Figure 14C:
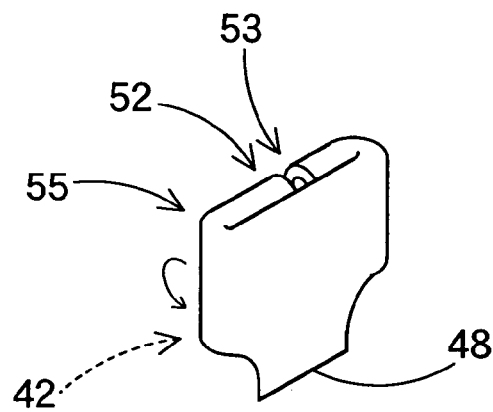
Figure 14D:
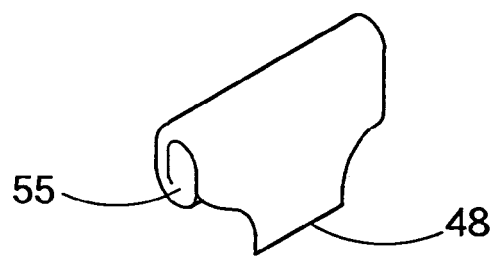

The airbag may be roll-folded once more in the final stage of folding work. For example, as shown in FIGS. 14A and 14B, an airbag 40D is roll-folded on the vehicular body side wall 42 bringing the upper end 47 of the flat expanded airbag 40D closer to the lower end 48. Subsequently as shown in FIG. 14C, the left and right ends 52 and 53 of the folded portion 51 are folded back either forward, rearward or upward so as to fit the transverse width of the housing portion 17. Then as shown in FIGS. 14C and 14D, the folded portion 55 is folded back on the vehicular body side wall 42, and thus the folding work of the airbag 40D is completed.

Thereafter, the airbag 40D is housed in the case 13, as the airbag 40, thereby forming an airbag module SA for attachment to the vehicle.

Figure 15:
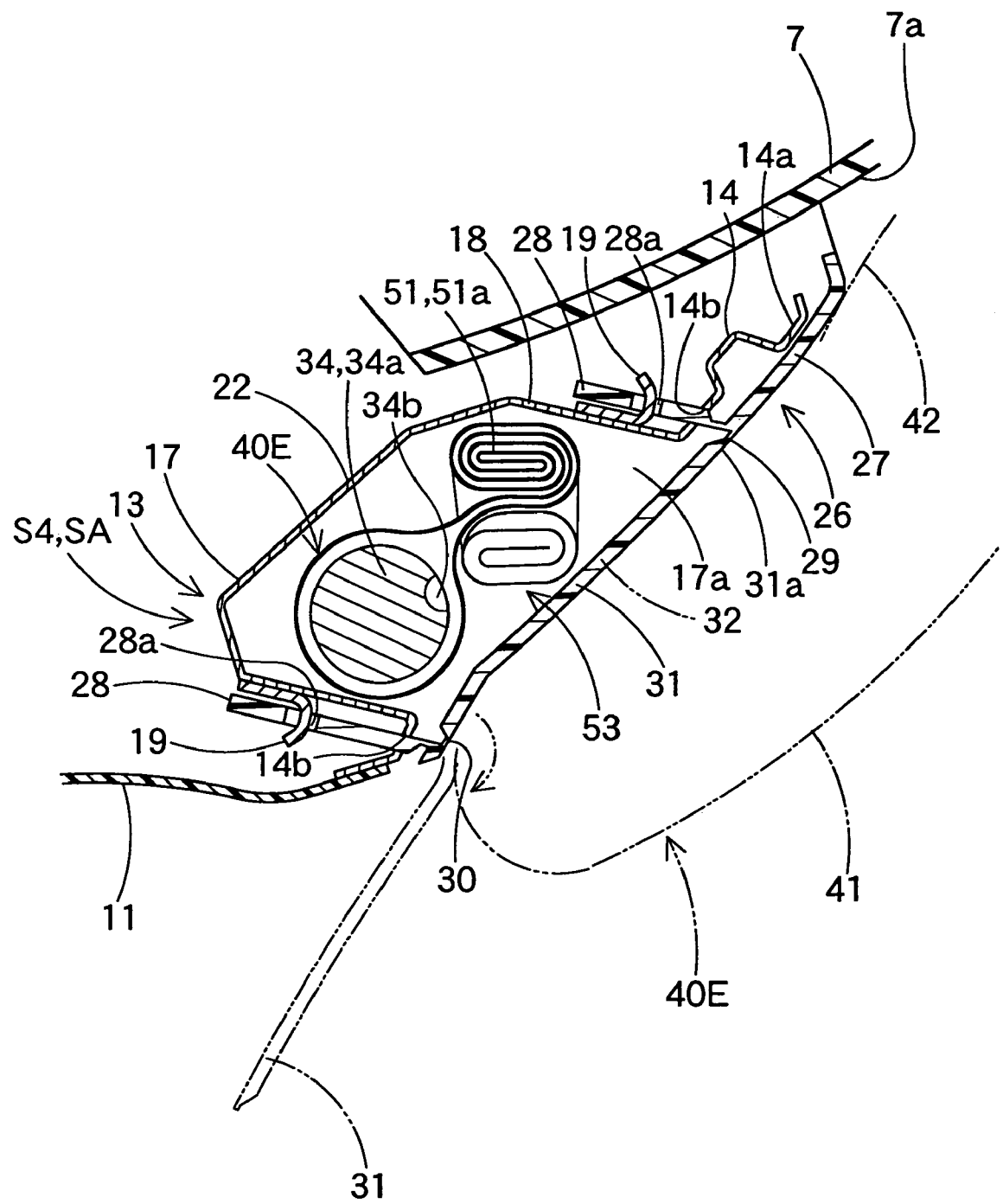
FIG. 15 is a schematic enlarged vertical section of a fourth embodiment of the knee protection airbag device, taken along the longitudinal direction of the vehicle.

Alternatively, as in a knee protection airbag device S4 of a fourth embodiment shown in FIGS. 15 and 16, left and right ends 52 and 53 of the folded portion 51 of an airbag 40E may be folded downward relative to a central portion 51a of the folded portion 51 on the occupant's side wall 41.

Figure 16A:
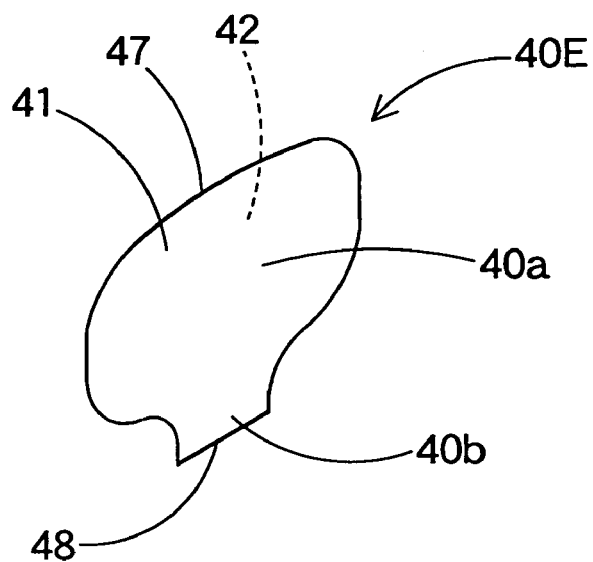
FIG. 16 schematically illustrates the folding process of an airbag of the fourth embodiment.
Figure 16B:
Figure 16B:
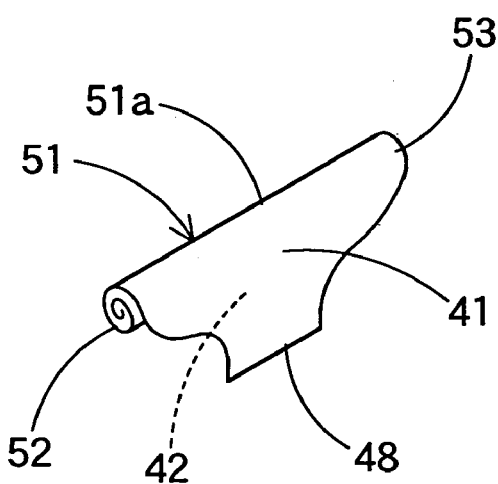

More specifically, as shown in FIGS. 16A and 16B, folding of the airbag 40E begins, from flat expanded state in which the vehicular body side wall 42 and the occupant's side wall 41 are overlaid on each other, with roll-folding to bring its upper end 47 closer to the lower end 48 on the vehicular body side wall 42.

Figure 16C:
Figure 16C:
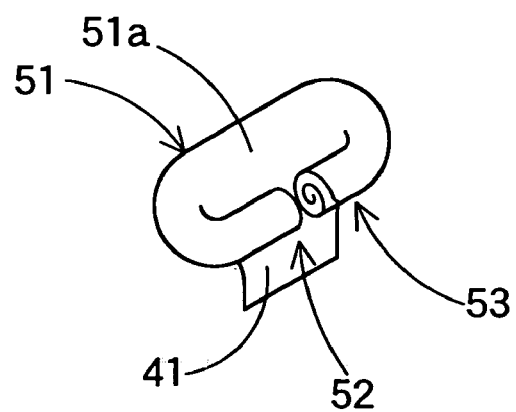

Subsequently, as shown in FIGS. 16B and 16C, the left and right ends 52 and 53 of the roll-folded portion 51 are folded back to narrow the transverse width of the airbag 40E to fit the transverse width of the housing portion 17. In this embodiment, the left and right ends 52 and 53 are so folded on the occupant's side wall 41 as to be located below the transverse center 51a of the folded portion 51. After folding, the airbag 40E is mounted on the vehicle in the same process as the first embodiment.

Figure 17A:
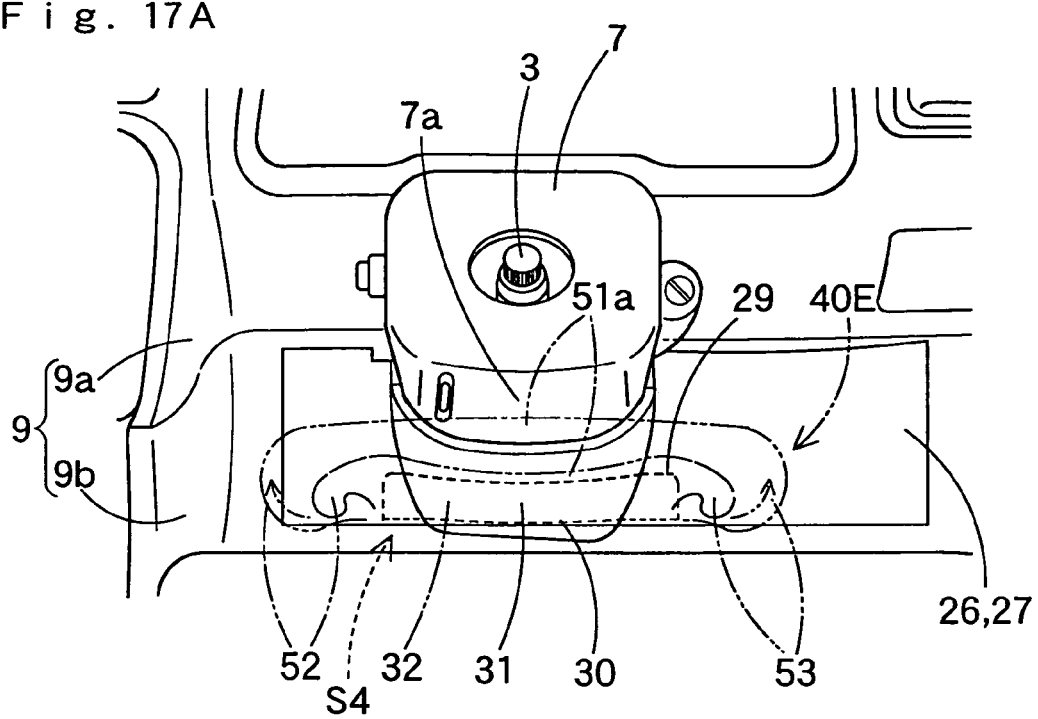
FIG. 17 is a schematic front view illustrating the airbag deployment in the fourth embodiment, as viewed from the rear side of the vehicle.
Figure 17A:
Figure 17B:
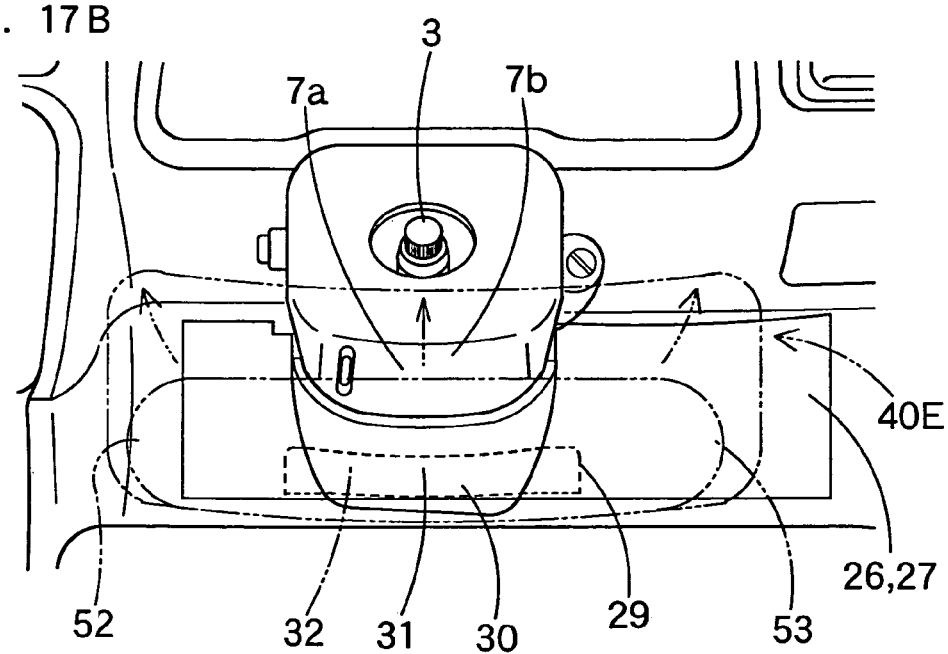

In the fourth embodiment, in the initial stage of airbag 40E deployment, the left and right ends 52 and 53 of the folded portion 51 unfold by turning upward and come back in the same horizontal line as the center 51a of the folded portion 51. Thus the left and right ends 52 and 53 are restored to the state before being folded back. The center 51a of the folded portion 51 is prevented, by the left and right ends 52 and 53 positioned on the occupant's side wall 41, from unfolding until the restoration of the left and right ends 52 and 53. In other words, the center 51a of the folded portion 51 is prevented from partially inflating upward until the left and right ends 52 and 53 are restored by unfolding. As a result, the unfolding of the folded portion 51 is performed as follows: Firstly, as in FIG. 17A, the left and right ends 52 and 53 turn upward and are placed in the same horizontal line as the center 51a while the center 51a is prevented from partially inflating upward. Then as shown in FIG. 17B, the unfolding of the folded portion 51 is performed generally uniformly in generally entire transverse area.

Consequently, since the airbag 40E of the fourth embodiment deploys upward while partial thickening is prevented, the airbag 40E is able to deploy upward further smoothly even if a gap between the column cover lower surface 7a on the vehicular body side and the driver MD is narrow.

Figure 18A:
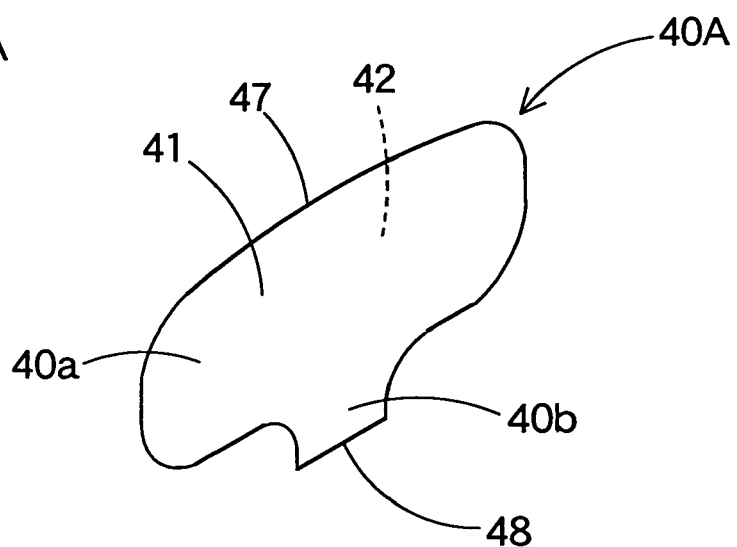
FIG. 18 schematically illustrates the folding process of an airbag used in still another embodiment.
Figure 18A:
Figure 18B:
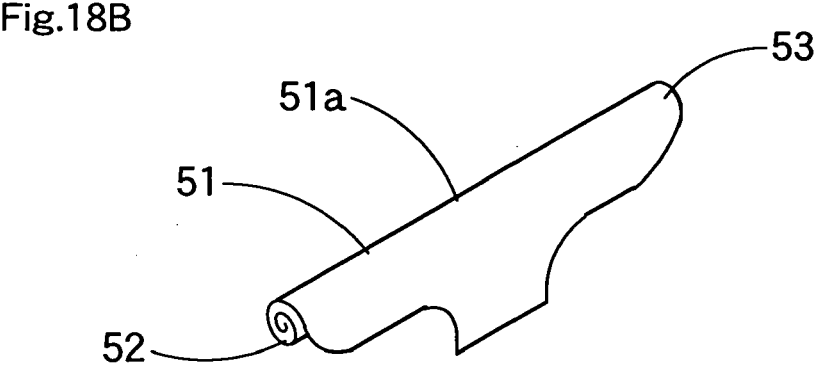
Figure 18B:
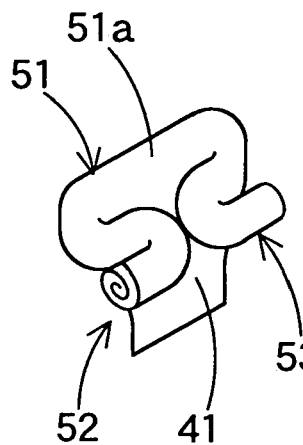
Figure 18B:
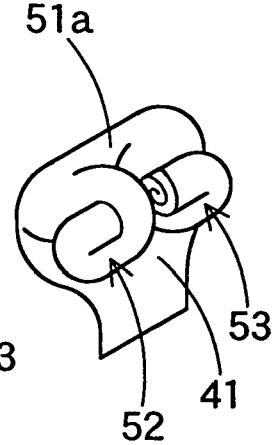
Figure 18B:
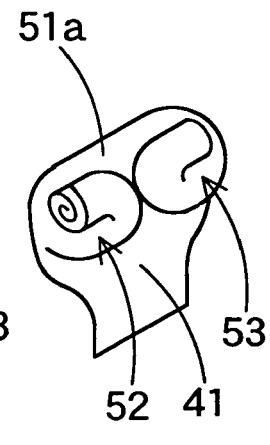
Figure 18B:
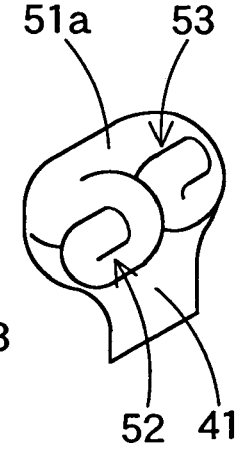

In case the left and right ends 52 and 53 of the folded portion 51 are folded on the occupant's side wall 41 and below the center 51a, the airbag 40A elongated in the transverse direction may be folded as follows: Firstly, as shown in FIGS. 18A and 18B, the airbag 40A is roll-folded on the vehicular body side wall 42 bringing the upper end 47 closer to the lower end 48 from flat expanded state. Subsequently, as shown in FIG. 18C, the left and right ends 52 and 53 of the folded portion 51 are bellows-folded on the occupant's side wall, and are finally brought close to each other. Of course, as shown in FIG. 18E, the left and right ends 52 and 53 of the folded portion 51 may be individually roll-folded internally toward the transverse center 51a. Alternatively, as shown in FIG. 18D, the left and right ends 52 and 53 of the folded portion 51 may be roll-folded outwardly and finally brought close to each other. These folding methods are preferably adopted in the airbag 40A with great transverse width as flatly expanded with the vehicular body side wall 42 and the occupant's side wall 41 overlaid on each other. Moreover, the left and right ends 52 and 53 of the folded portion 51 may be folded asymmetrically. As shown in FIG. 18F, for example, the left end 52 side may be roll-folded outwardly while the right end 53 side is roll-folded internally. The inversion may also be adopted, or alternatively, one side may be bellows-folded.

Moreover, the left and right ends 52 and 53 of the folded portion 51 may also be folded and located toward obliquely lower rear side, for example, not only right below the center 51a of the folded portion 51.

Figure 19:
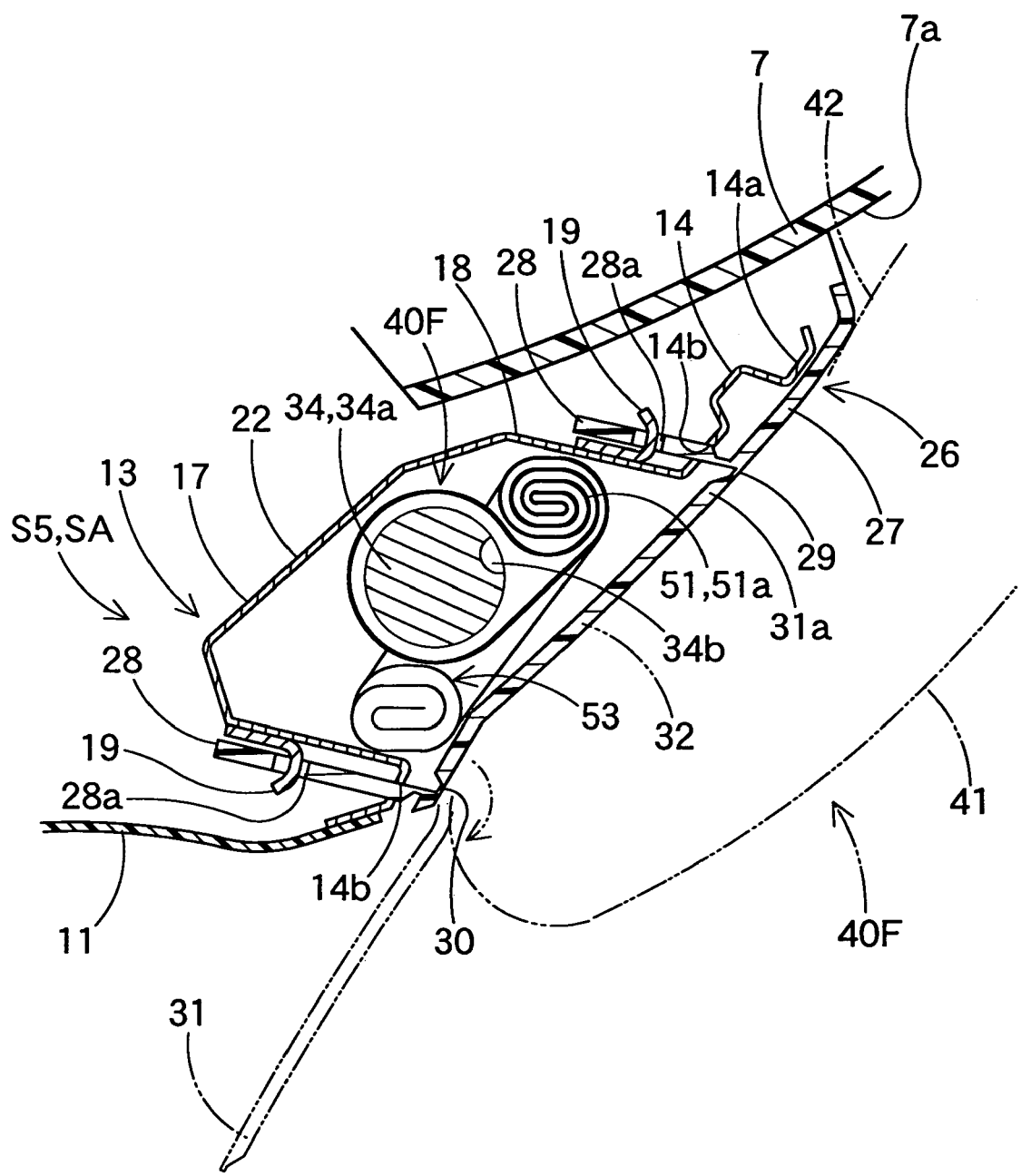
FIG. 19 is a schematic enlarged vertical section of a fifth embodiment of the knee protection airbag device, taken along the longitudinal direction of the vehicle.
Figure 20A:
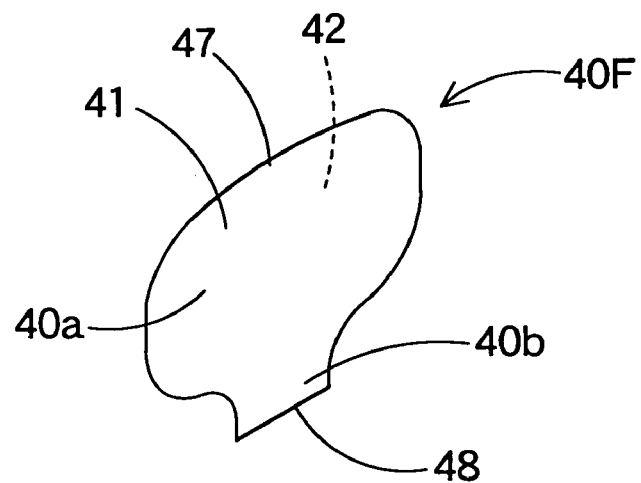
FIG. 20 schematically illustrates the folding process of an airbag of the fifth embodiment.
Figure 20A:
Figure 20B:
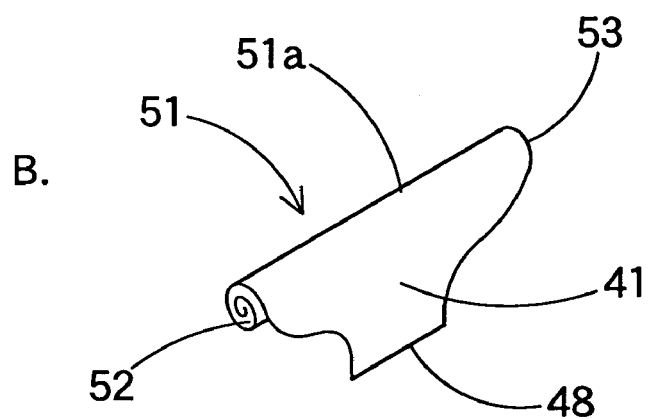
Figure 20B:
Figure 20C:
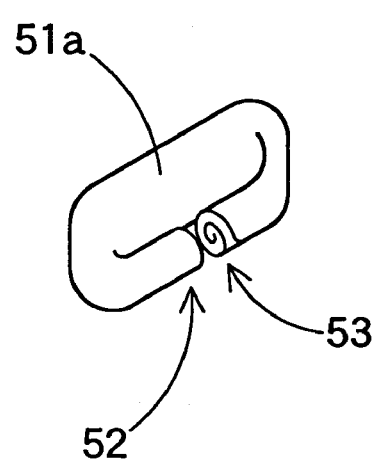
Figure 21:
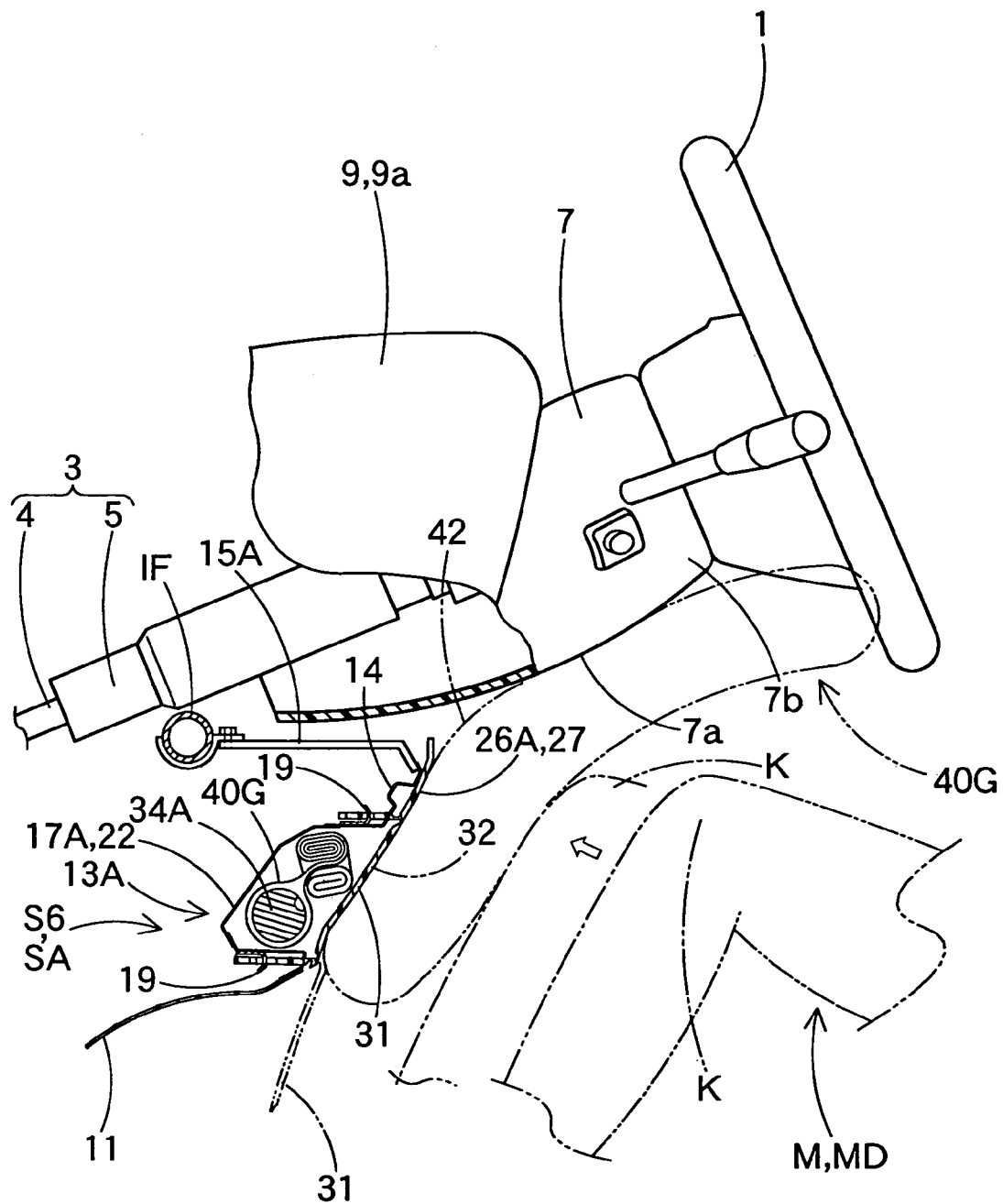
FIG. 21 is a schematic vertical section of a sixth embodiment of the knee protection airbag device in action, taken along the longitudinal direction of the vehicle.
Figure 22:
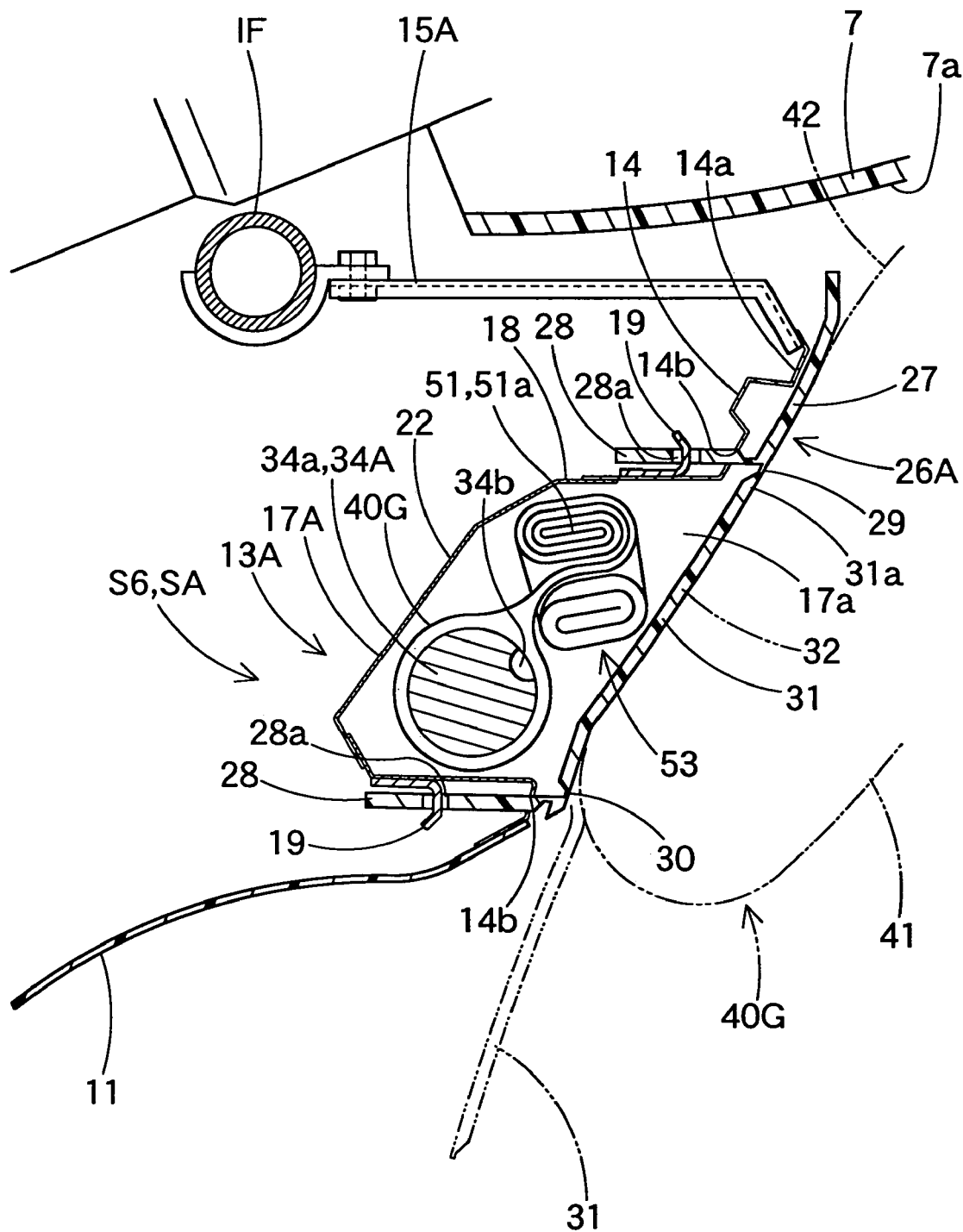
FIG. 22 is a schematic enlarged vertical section of the sixth embodiment of the knee protection airbag device, taken along the longitudinal direction of the vehicle.
Figure 23:
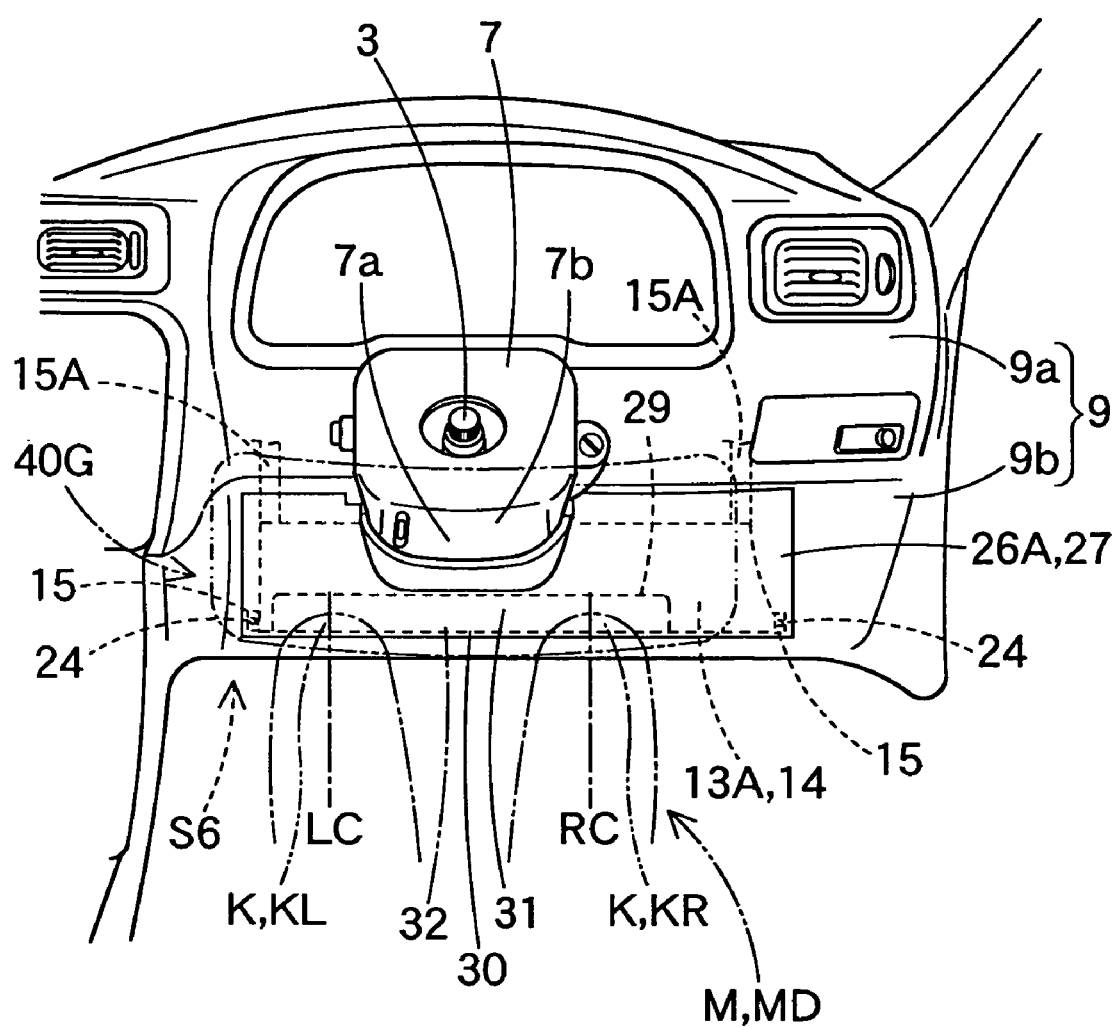
FIG. 23 is a schematic front view of the sixth embodiment of the knee protection airbag device in action, as viewed from the rear side of the vehicle.

As in a knee protection airbag device S5 of a fifth embodiment shown in FIG. 19, furthermore, the left and right ends 52 and 53 of the roll-folded portion 51 of the airbag 40F may be folded and located below the center 51a of the folded portion 51, and below the body 34a of the inflator 34 on the occupant's sidewall 41. This airbag 40F is firstly roll-folded on the vehicular body side wall 42 bringing the upper end 47 of the flat expanded airbag 40F close to the lower end 48, as shown in FIGS. 20A and 20B. Subsequently, as shown in FIG. 20C, the left and right ends 52 and 53 of the roll-folded portion 51 are folded on the occupant's sidewall 41 and below the inflator body 34a to complete the folding work. Thereafter, as the airbag 40, the airbag 40F is housed in the housing case 13 to form an airbag module SA, and is mounted on the vehicle.

When the airbag is folded to reduce its transverse width, the airbag may be folded as an airbag 40G in a knee protection airbag device M6 of a sixth embodiment shown in FIGS. 21 to 24. In this airbag device M6, the housing case 13A is fixed to the dashboard reinforcement IF at left and right upper mounting pieces 15A. The housing portion 17A of the housing case 13A, together with the inflator 34A and the mounting portion 40b of the airbag 40G, has a wide transverse width. The door 31 of the airbag cover 26A is formed transversely long corresponding to an opening 17a of the widened housing portion 17A. The sixth embodiment differs from the first embodiment in these points, and in a folding method of the airbag 40G. However, other parts of the sixth embodiments are constructed similarly to the first embodiment.

Figure 24A:
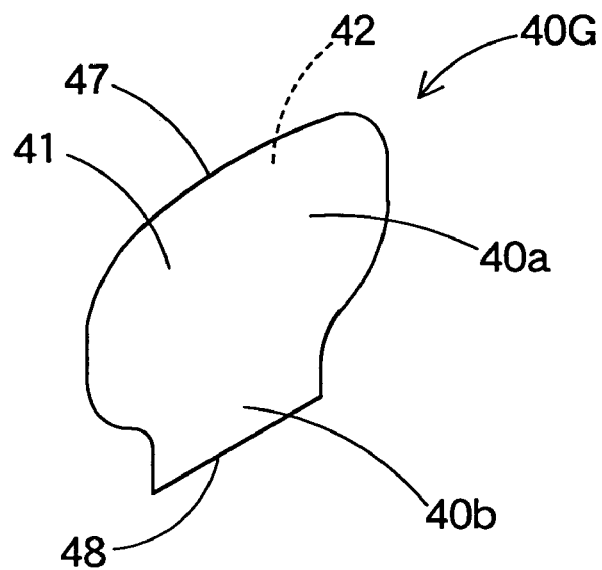
FIG. 24 schematically illustrates the folding process of the airbag of the sixth embodiment.
Figure 24B:
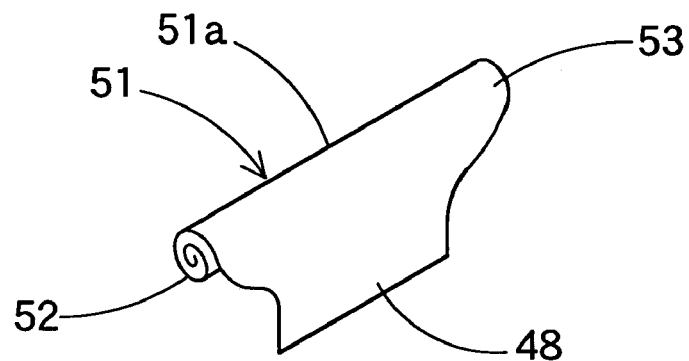
Figure 24C:
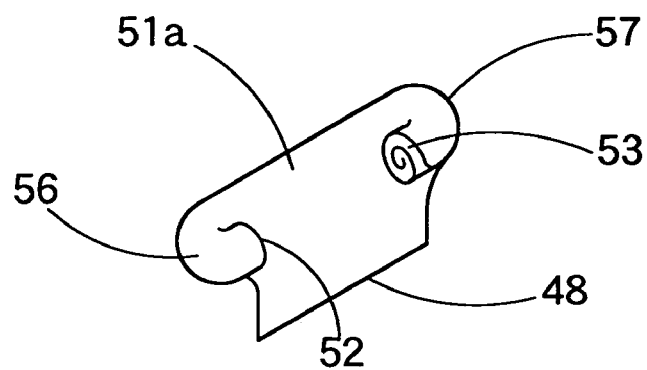

As shown in FIGS. 24A and 24B, the airbag 40G is firstly roll-folded on the vehicular body side wall 42 bringing the upper end 47 of the flat expanded state close to the lower end 48. Subsequently, as shown in FIG. 24C, the left and right ends 52 and 53 of the folded portion 51 are folded back on the occupant's side wall 41 and below the inflator body 34a, to complete the folding work. At this time, the left and right ends 56 and 57 of the completely folded airbag 40G, as mounted on the vehicle, are located outward of the knee centers LC and RC (refer to FIGS. 23 and 25) of the knees KL and KR of the driver MD along the transverse direction.

After folding, the airbag 40G is housed in the housing case 13A as the airbag 40 to form an airbag module SA, and is mounted on the vehicle.

Figure 25:
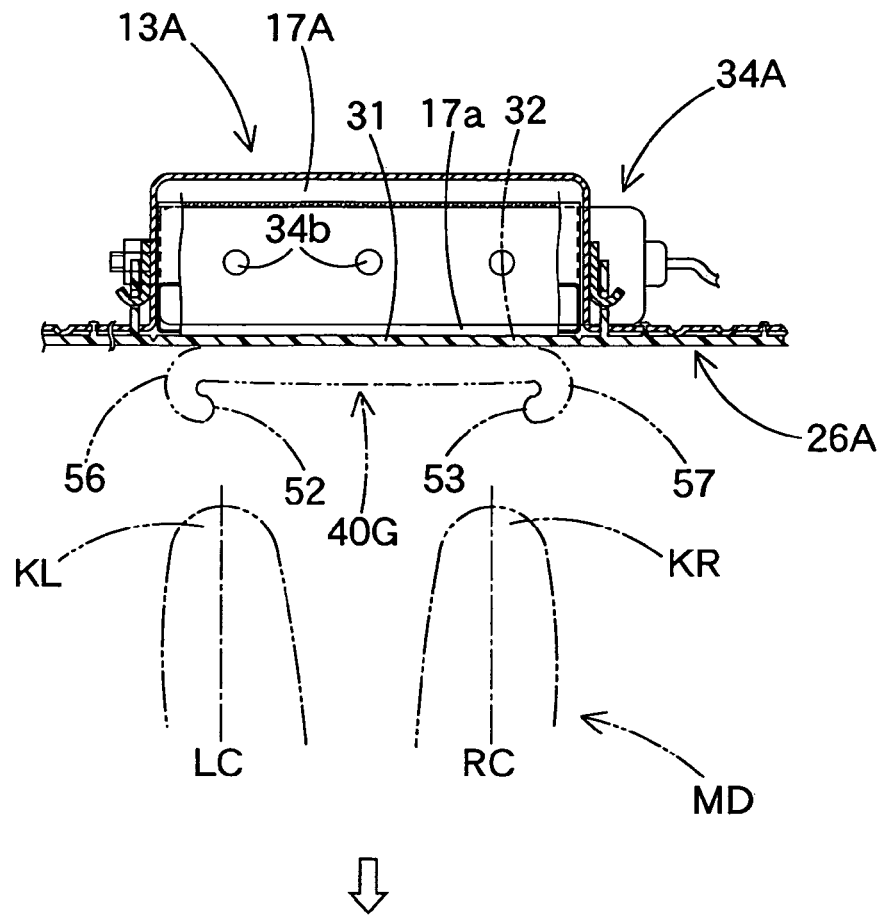
FIG. 25 illustrates the airbag deployment of the airbag in the sixth embodiment by schematic transverse sections.
Figure 25:
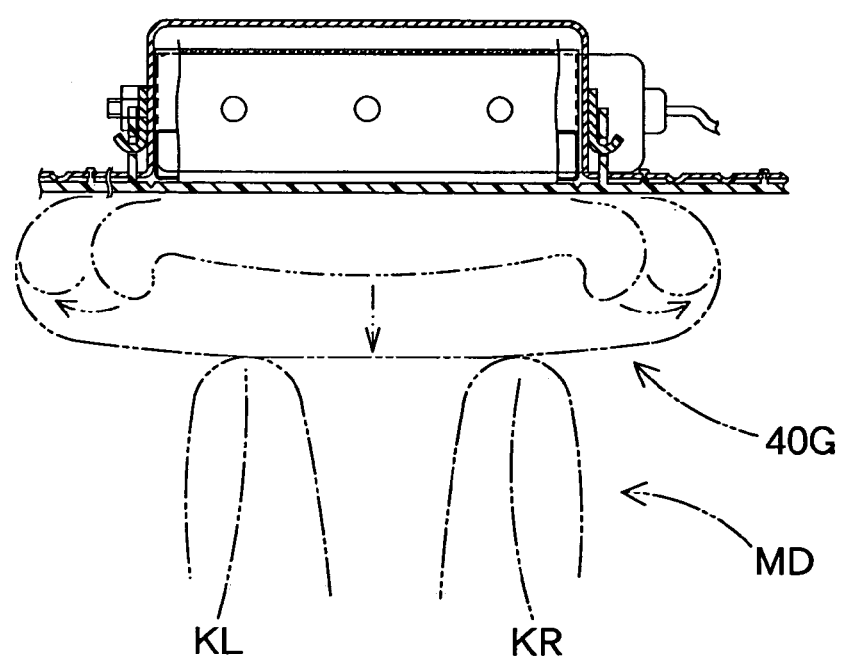

In the sixth embodiment, the airbag 40G in housed state is wide enough to protect the front side of the knees KL and KR of the driver MD. As shown in FIG. 25, therefore, if the airbag 40G protrudes rearward from the deployment opening 32 of the housing portion 17A in the initial stage of deployment, the airbag 40G is able to protect the individual knee centers LC and RC of the knees KL and KR of the driver MD properly.

In the sixth embodiment, moreover, the folded and piled portion of the left and right ends 52 and 53 sides in the folded portion 51 is less than other embodiments. Therefore, it is possible to reduce substantial depth of housing space for the airbag 40G.

Also in the sixth embodiment, the left and right ends 52 and 53 of the folded portion 51 can be folded back upward, rearward, or forward of the center 51a of the folded portion 51. Alternatively, only one of the left and right ends 52 and 53 may be folded back. Further alternatively, in bringing the upper end 47 close to the lower end 48, the airbag 40G may be roll-folded on the occupant's side wall 41, bellows-folded, or cactus-folded.

Figure 26:
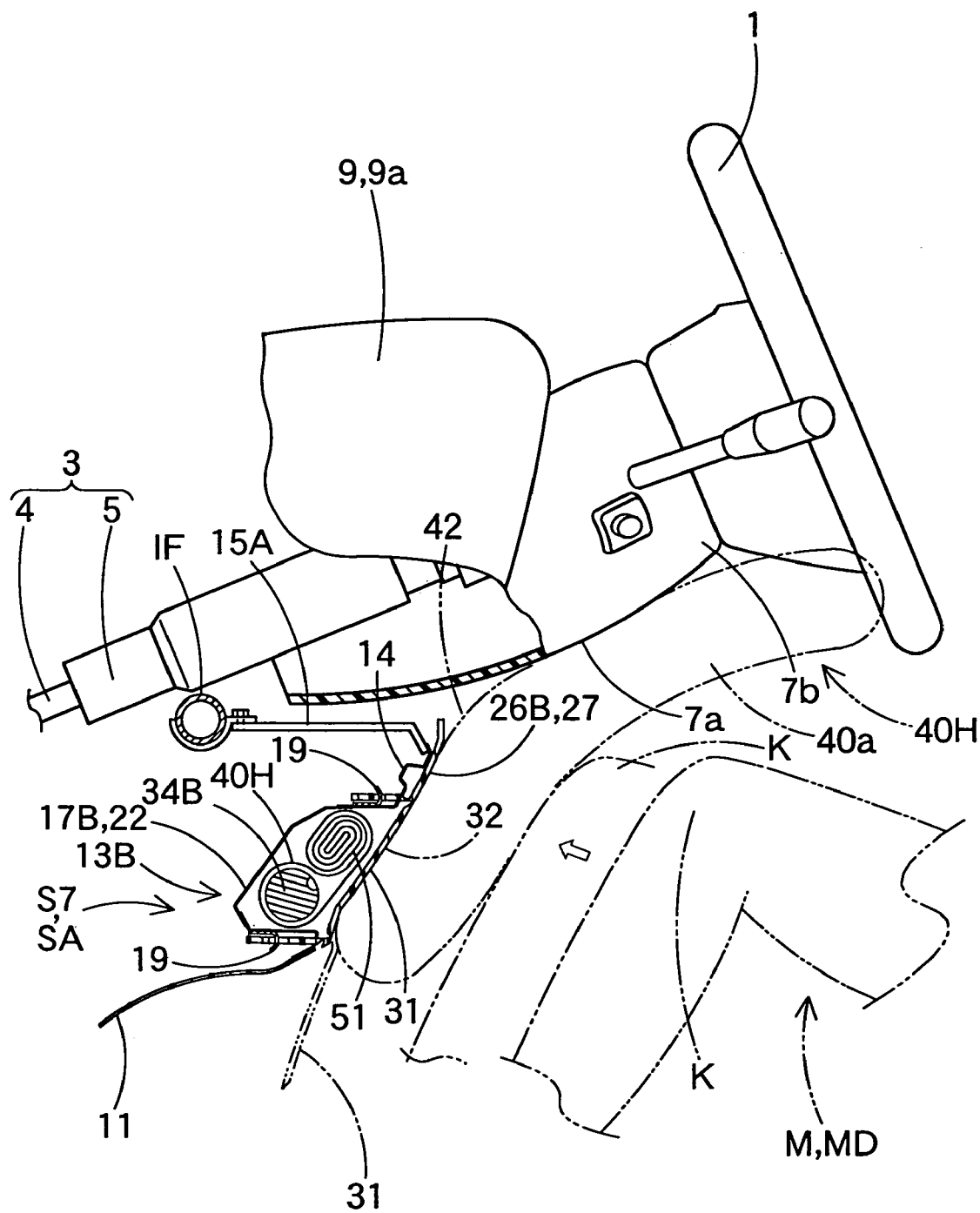
FIG. 26 is a schematic vertical section of a seventh embodiment of the knee protection airbag device in action, taken along the longitudinal direction of the vehicle.
Figure 27:
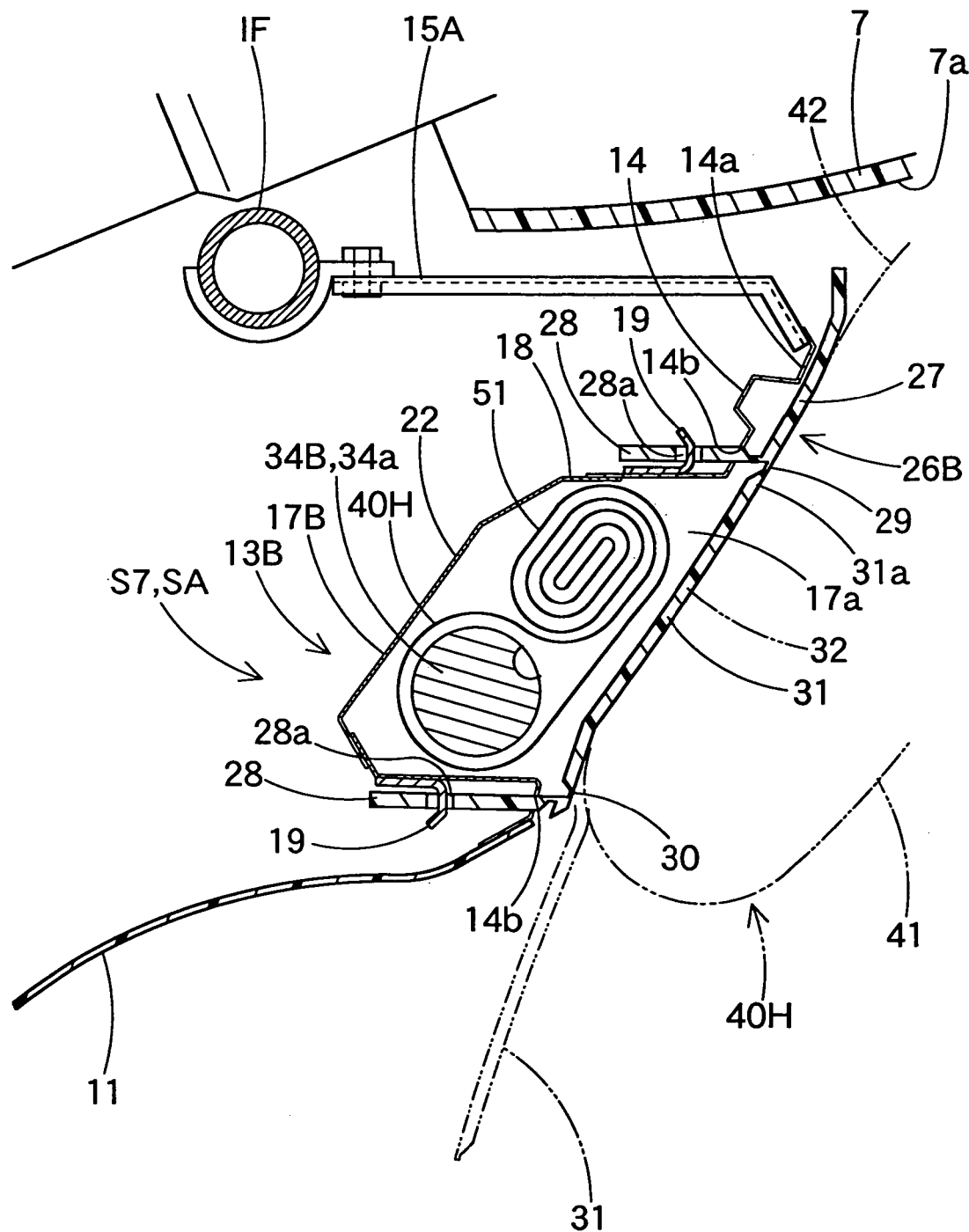
FIG. 27 is a schematic enlarged vertical section of the seventh embodiment of the knee protection airbag device, taken along the longitudinal direction of the vehicle.
Figure 28:
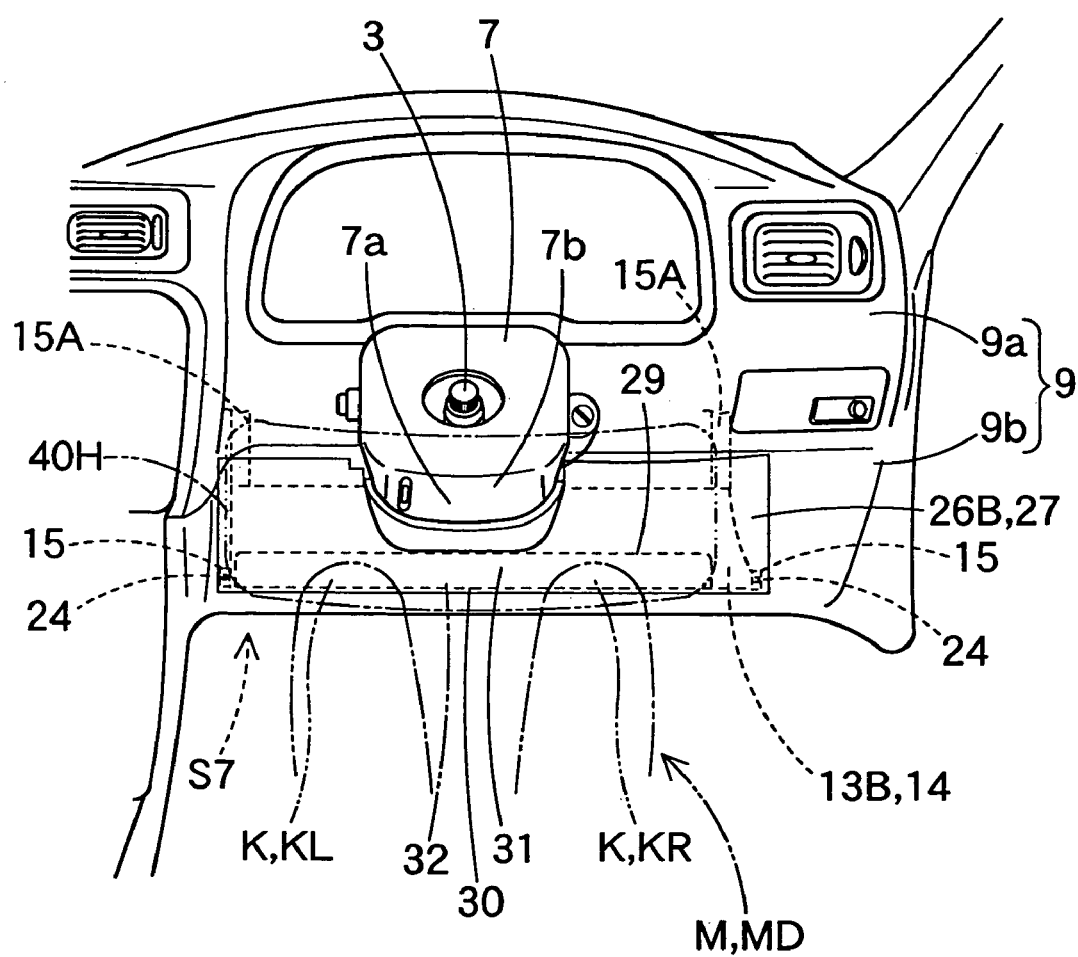
FIG. 28 is a schematic front view of the seventh embodiment of the knee protection airbag device in action, as viewed from the rear side of the vehicle.

Furthermore, a construction of a knee protection airbag device S7 of a seventh embodiment shown in FIGS. 26 to 28 may be adopted. In this airbag device M7, a housing portion 17B of a housing case 13B, together with an inflator 34B and amounting portion 40b of an airbag 40H, has an even wider transverse width compared with the airbag device S6. The door 31 of the airbag cover 26B is formed transversely long corresponding to an opening 17a of the widened housing portion 17B. Moreover, folding method of the airbag 40H differs from that of the sixth embodiment. However, in other parts, the seventh embodiment is similarly constructed to the sixth embodiment.

Figure 29A:
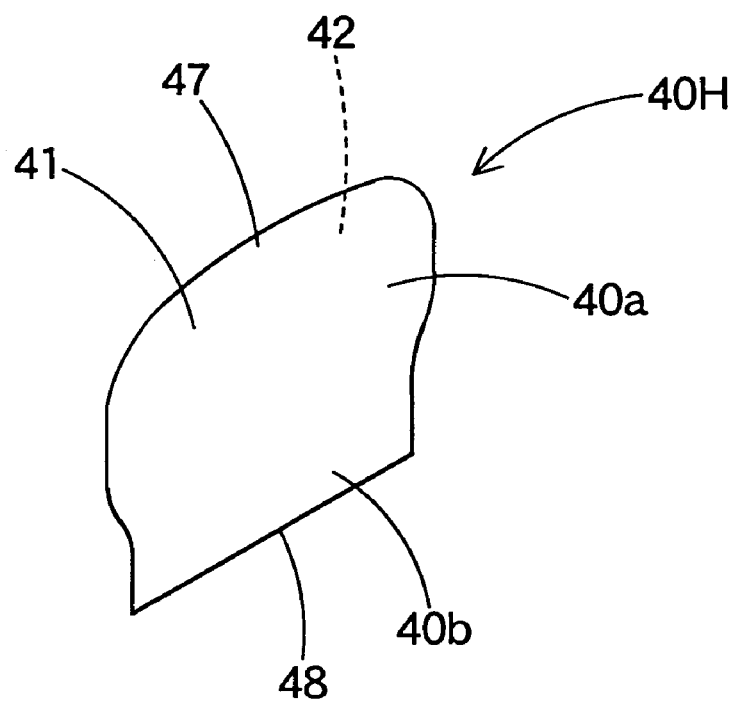
FIG. 29 schematically illustrates the folding process of an airbag of the seventh embodiment.
Figure 29A:
Figure 29B:
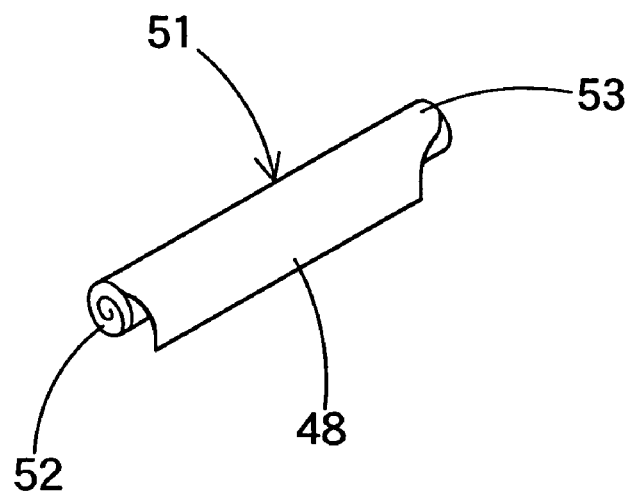

As shown in FIGS. 29A and 29B, the airbag 40H is folded from flat expanded state in which the vehicular body side wall 42 and the occupant's side wall 41 are overlaid on each other, bringing the upper end 47 close to the lower end 48. The airbag 40H only thus folded is housed in the housing portion 17B of the housing case 13B to form an airbag module SA. Then the airbag module SA is mounted on the vehicle.

The transverse width of the airbag 40H as completely deployed is so configured as to widely cover the front side of the knees KL and KR of the driver MD, as the aforementioned airbags.

The folded airbag 40H is housed in the housing portion 17B so that the left and right ends 52 and 53 may be located outward of the knee centers LC and RC of the left and right knees KL and KR of the driver MD in the transverse direction.

In the seventh embodiment, if inflation gas is introduced in the airbag 40H, the airbag 40H protrudes rearward from the deployment opening 32 of the housing portion 17B, and immediately deploys upward.

Figure 30:
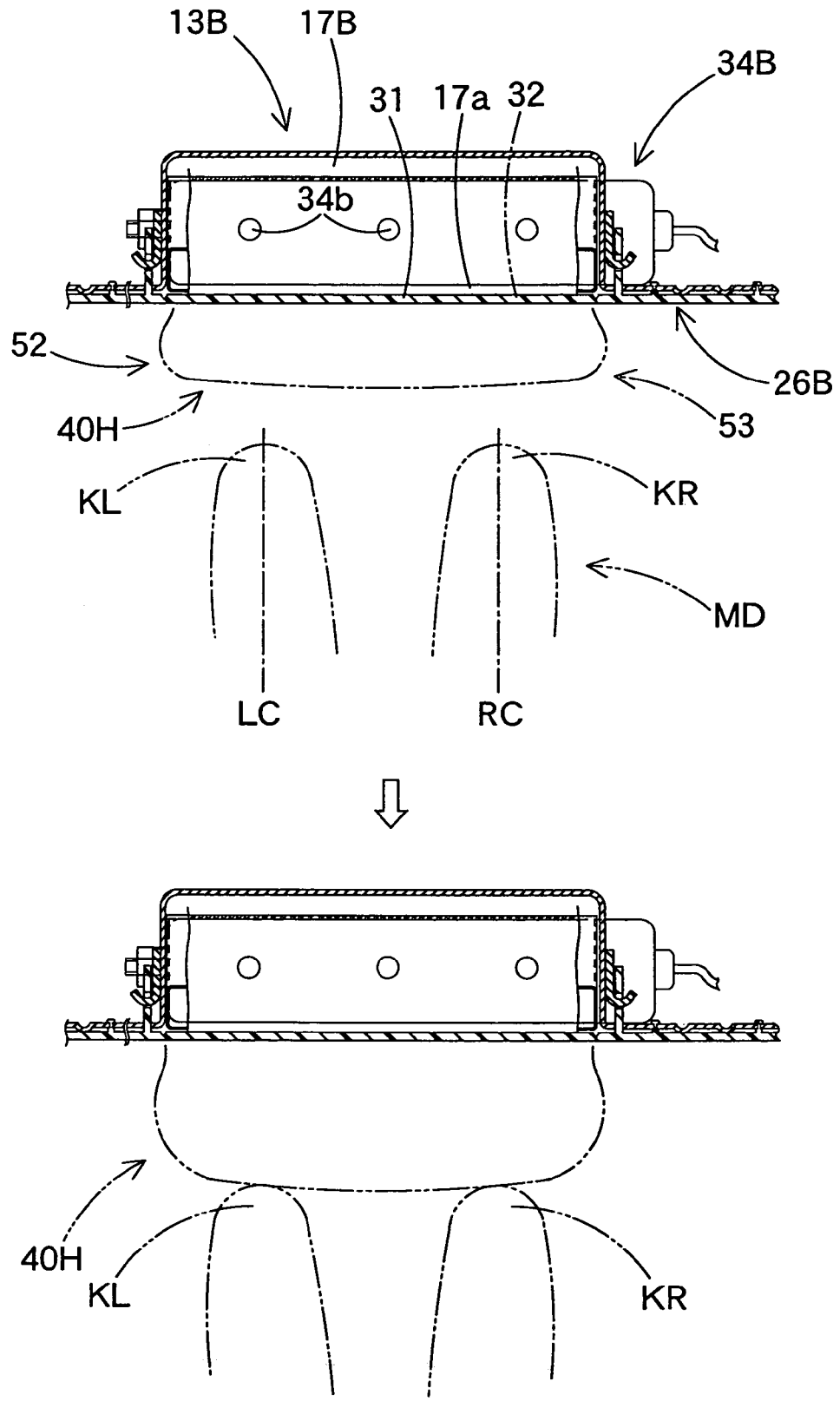
FIG. 30 illustrates the airbag deployment of the airbag in the seventh embodiment by schematic transverse sections.

More specifically, as shown in FIG. 30, as soon as the airbag 40H protrudes rearward from the deployment opening 32 of the housing portion 17B, it is deployed in front of the knees K (KL and KR) of the driver MD with the width wide enough to protect the knees K (KL and KR). Therefore, the airbag 40H in the initial stage of deployment is able to protect the knees KL and KR properly in a wide area even if the knees KL and KR are moved in the transverse direction. Moreover, even if the knees K are bent and rise thereafter, the airbag 40H has already been through the initial stage of deployment, and deployed upward from the periphery of the deployment opening 32 by that time, as indicated by double-dotted lines in FIG. 26. Therefore, the airbag 40H is able to protect the rising knees K with a part 40a thereof completely deployed upward.

Consequently, the knee protection airbag device S7 of the seventh embodiment, too, is able to deploy the airbag 40H effectively along with the course of time from the start to completion of the airbag 40H deployment, and to protect the knees K of the driver MD properly.

In the knee protection airbag device S7, the airbag 40H is not folded to reduce its transverse width, not like the airbag 40 of the first embodiment. In the airbag device S7, accordingly, the airbag 40H is able to complete the deployment quickly.

Further in the seventh embodiment, the left and right ends 52 and 53 of the folded portion 51 are not folded, and therefore, substantial depth of housing space for airbag 40H is possibly reduced in comparison with other embodiments.

In the seventh embodiment, too, the airbag 40H is housed in the housing portion 17B with the left and right ends 52 and 53 located outward of the individual knee centers LC and RC of the left and right knees KL and KR of the driver MD in the transverse direction. Accordingly, the airbag 40H is able to protect the knee centers LC and RC of the left and right knees KL and KR of the driver MD properly as soon as it protrudes rearward from the deployment opening 17a of the housing portion 17B in the initial stage of deployment.

In the seventh embodiment, too, when bringing the upper end 47 close to the lower end 48, the airbag 40H may be roll-folded on the occupant's side wall 41, bellows-folded or cactus-folded.

Figure 31:
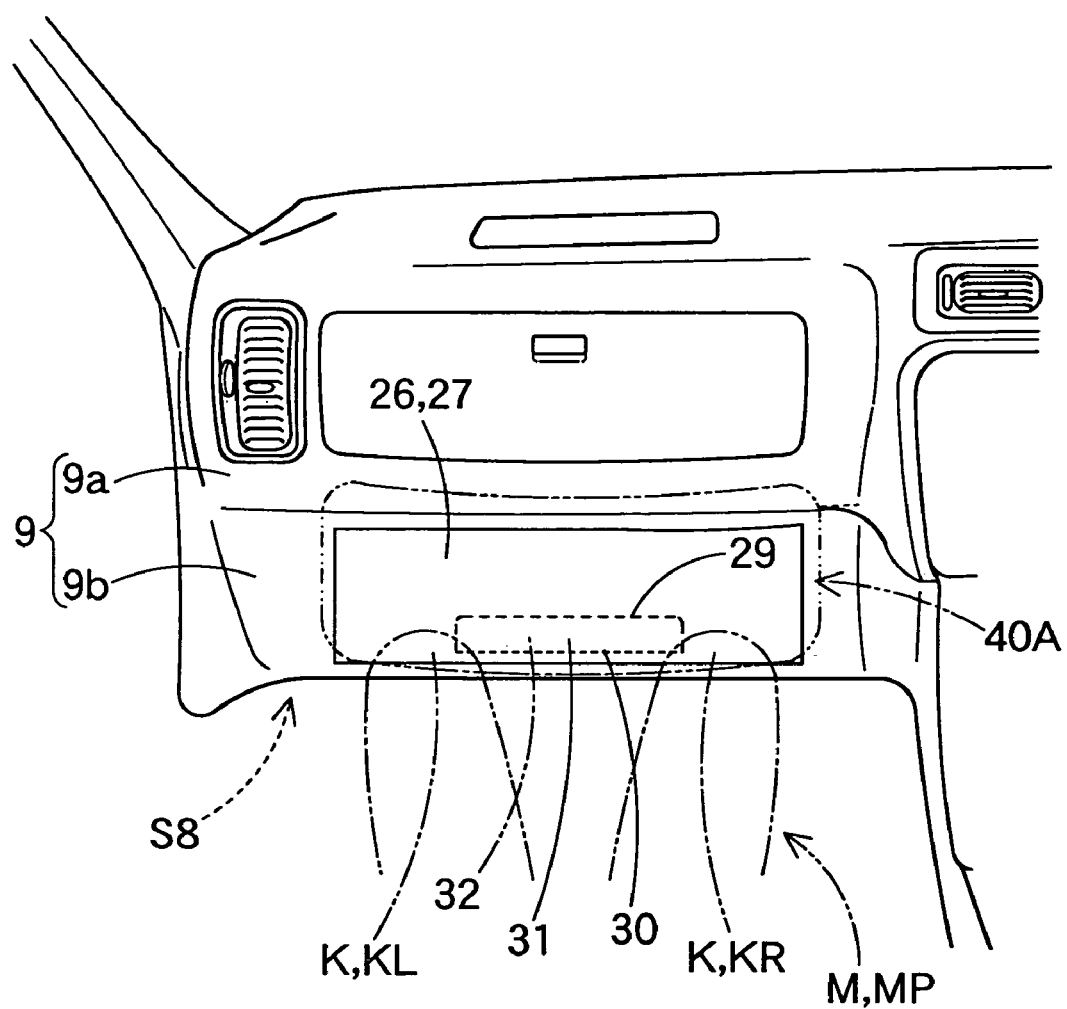
FIG. 31 is a front view of an eighth embodiment of the knee protection airbag device disposed in front of the front passenger's seat, as viewed from the rear side of the vehicle.

The foregoing embodiments have taken the airbag devices S1, S2, S3, S4, S5, S6 and S7 arranged in front of the driver MD for protecting the knees K of the driver MD as an example. As an airbag device S8 shown in FIG. 31, however, the airbag device may be located in front of a front seat passenger MP seated in front passenger's seat for protecting the knees K (KL and KR) of the front seat passenger MP. In the airbag device S8, an airbag 40A employed therein has a wider transverse width as shown in FIG. 10, than the airbag 40 of the airbag device S1, and folded as in FIGS. 10A, 10B and 10C before housed. Moreover, the plate-like portion 14 of the housing case 13 and the airbag cover 26 are formed flatly corresponding to a portion of the dashboard 9 in front of the front passenger's seat. Except these points, other parts of the airbag device S8 are constructed similarly to the airbag device S1.

What is claimed is:

1. A knee protection airbag device arranged in front of an occupant knee area, the airbag device comprising an airbag folded and housed in undeployed condition, and upon inflow of inflation gas, the airbag protrudes rearward from a deployment opening of the housing to deploy upward and be located in front of the occupant knee area between a vehicle body and the occupant knee area, wherein the airbag has a generally rectangular plate shape when it is completely expanded and inflated, and wherein a transverse width of the airbag, when the airbag is completely inflated, is greater than a transverse width of the housing, such that the airbag covers the occupant knee area, the airbag comprising an occupant side wall disposed toward the knee area and a vehicular body side wall disposed toward the vehicular body, respectively upon deployment, a lower side of the airbag, while the airbag is expanded, or developed, with the occupant side wall and the vehicular body side wall overlaid on each other, constitutes an upstream part of an inflation gas channel upon deployment of the airbag, in a folding process, from a flattened state in which the occupant side wall and the vehicular body side wall are overlaid on each other, the airbag firstly is folded to bring an upper end of the airbag close to a lower end of the airbag, which forms a folded portion, and then the airbag is folded to reduce the width of the airbag, and the airbag is housed as thus folded, wherein, when reducing the transverse width of the airbag, left and right ends of the folded portion of the airbag, which were folded to bring the upper end close to the lower end, are folded downward and toward a lateral center of the folded portion and on the occupant side wall.

2. A knee protection airbag device according to claim 1, wherein the airbag is roll-folded on the vehicular body side wall from the upper end when the upper end of the airbag is brought close to the lower end.

3. A knee protection airbag device according to claim 1, wherein, when reducing the transverse width of the airbag, left and right ends of the folded portion of the airbag, which were folded to bring the upper end close to the lower end, are roll-folded toward the transverse center of the folded portion so as to be close to each other.

4. A knee protection airbag device according to claim 1, wherein:
   the airbag further comprises a tether for joining the vehicular body side wall and the occupant side wall to regulate thickness of the inflated airbag; and
   the tether is arranged along the transverse direction so as to direct inflation gas flowing from the upstream side of the airbag toward the left and right directions of the airbag.

* * * * *